(12) United States Patent
Raslambekov et al.

(10) Patent No.: US 11,607,296 B1
(45) Date of Patent: Mar. 21, 2023

(54) SYSTEMS AND METHODS FOR RECONSTRUCTING A GINGIVAL PROFILE IN AN ARCH FORM 3D DIGITAL MODEL

(71) Applicant: Oxilio Ltd, Larnaca (CY)

(72) Inventors: Islam Khasanovich Raslambekov, Long Island City, NY (US); Artem Makhno, Long Island City, NY (US); Dmitrii Garshin, Long Island City, NY (US); Zelimkhan Gerikhanov, Long Island City, NY (US); Oleksandr Khmil, Long Island City, NY (US); Dmitrii Bubelnik, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/837,643

(22) Filed: Jun. 10, 2022

(51) Int. Cl.
| | |
|---|---|
| *G06T 15/00* | (2011.01) |
| *A61C 13/34* | (2006.01) |
| *G06T 17/20* | (2006.01) |
| *G06T 19/20* | (2011.01) |
| *G06T 7/70* | (2017.01) |

(Continued)

(52) U.S. Cl.
CPC .............. *A61C 13/34* (2013.01); *G06F 30/10* (2020.01); *G06T 7/0012* (2013.01); *G06T 7/64* (2017.01); *G06T 7/70* (2017.01); *G06T 17/20* (2013.01); *G06T 19/20* (2013.01); *G06T 2200/04* (2013.01); *G06T 2207/30036* (2013.01); *G06T 2219/2004* (2013.01); *G06T 2219/2008* (2013.01)

(58) Field of Classification Search
USPC ........................................................ 345/418
See application file for complete search history.

(56) References Cited

U.S. PATENT DOCUMENTS 7,711,447 B2   5/2010   Lu et al.
9,503,282 B2 * 11/2016  Kody ................... H04N 1/0022
(Continued)

OTHER PUBLICATIONS

Wu J, Jiang JH, Xu L, Liang C, Bai Y, Zou W. A pilot clinical study of Class III surgical patients facilitated by improved accelerated osteogenic orthodontic treatments. The Angle Orthodontist. Jul. 2015;85(4):616-24.*

(Continued)

*Primary Examiner* — Phu K Nguyen
(74) *Attorney, Agent, or Firm* — BCF LLP

(57) ABSTRACT

A method of reconstructing a gingival profile comprising generating, by a processor, a defined cross section of an arch form model extending through a tooth axis of a given tooth and a defined gingiva region; identifying within a tooth cross section profile of the defined cross section a set of reference points for generating a parametric curve defining at least a portion of the tooth cross section profile; generating the parametric curve based on the set of reference points; generating a first undefined cross section of the arch form model extending through the tooth axis of the given tooth and an defined gingiva region; constructing in the first undefined cross section, at least a portion of the parametric curve, thereby generating a first reconstructed gingival profile, and updating the arch form model with the first reconstructed gingival profile; and storing the arch form model including the reconstructed gingival profile.

20 Claims, 19 Drawing Sheets

(51) Int. Cl.
  *G06T 7/00* (2017.01)
  *G06F 30/10* (2020.01)
  *G06T 7/64* (2017.01)

(56) References Cited

U.S. PATENT DOCUMENTS

| | | |
|---|---|---|
| 10,650,517 B2 | 5/2020 | Parpara et al. |
| 10,695,147 B1 | 6/2020 | Raslambekov |
| 10,888,397 B1 | 1/2021 | Raslambekov |
| 10,935,958 B2 | 3/2021 | Sirovskiy et al. |
| 11,213,373 B1* | 1/2022 | Raslambekov ...... A61C 11/025 |
| 11,351,011 B1* | 6/2022 | Raslambekov ........... G06T 7/12 |
| 2014/0379356 A1* | 12/2014 | Sachdeva ................ A61C 7/002 705/2 |
| 2018/0165818 A1* | 6/2018 | Tsai ........................ G06T 7/337 |
| 2020/0100871 A1* | 4/2020 | Wang ..................... G06F 17/18 |
| 2020/0214801 A1* | 7/2020 | Wang ..................... A61C 7/002 |
| 2020/0306012 A1 | 10/2020 | Roschin et al. |

OTHER PUBLICATIONS

Anh TN, Hamanaka R, Jinnai S, Komaki H, Yamaoka S, Tominaga JY, Koga Y, Yoshida N. Simulation of orthodontic tooth movement during activation of an innovative design of closing loop using the finite element method. American Journal of Orthodontics and Dentofacial Orthopedics. Aug. 1, 2021;160(2):240-9.*

Jang I, Tanaka M, Koga Y, Iijima S, Yozgatian JH, Cha BK, Yoshida N. A novel method for the assessment of three-dimensional tooth movement during orthodontic treatment. The Angle Orthodontist. May 2009;79(3):447-53.*

* cited by examiner

SYSTEMS AND METHODS FOR RECONSTRUCTING A GINGIVAL PROFILE IN AN ARCH FORM 3D DIGITAL MODEL

FIELD

The present technology relates to systems and methods for reconstructing a gingival profile in an arch form 3D digital model, such as for planning an orthodontic treatment for a patient or for manufacturing an orthodontic appliance as part of an orthodontic treatment.

BACKGROUND

Orthodontic treatment plans for treating malocclusions of teeth of a subject are typically based on image data of the subject's teeth and gingiva before the start of the orthodontic treatment. For example, the image data may be obtained using intra-oral scanning and used to generate a 3D digital model of the subject's teeth and gingiva.

However, in such a snap-shot of the subject's teeth, there may be portions of the teeth and/or gingiva which are not visible and therefore not able to be imaged, i.e. those portions that are occluded behind other oral structures during the imaging or due to inadequate lighting.

A 3D digital model of the teeth and/or gingiva using an incomplete imaging of the teeth and gingiva will not accurately reflect the actual profile of the teeth and/or gingiva. As the 3D digital model of the teeth and/or gingiva are used to plan the orthodontic treatment in a manner that takes into account efficacy of treatment, comfort to the subject during treatment, as well as safety of the teeth and gingiva, such inaccuracies may lead to treatment inefficiencies, discomfort and/or safety concerns. For example, where the orthodontic treatment comprises application of an orthodontic aligner to the subject's teeth, the inaccurate 3D digital modelling of the subject's teeth and gingiva may result in discomfort to the subject, damage to the subject's gingiva (including tissues around it, such as proximal blood vessels and nerve pathways, for example), whilst receiving the orthodontic treatment.

Furthermore, inaccurate gingival profile determination at the start of the treatment may be confounded by the fact that as the teeth move during a given segment of the orthodontic treatment, the profile of the gingiva further changes. As this change in gingival profile may affect the orthodontic treatment in the following segments of the orthodontic treatment, it could be desirable to update and monitor the gingival profile during different treatment segments.

SUMMARY

It is an object of the present technology to ameliorate at least some of the inconveniences present in the prior art.

Developers of the present technology have devised methods and systems for generating a 3D digital model of a subject's arch form in which undefined portions of a gingival profile have been reconstructed. The 3D digital model may have been derived from image data and may also be referred to as an arch form 3D digital model. The "as obtained" arch form 3D digital model from the image data may include undefined portions in which a gingival profile is not defined and defined portions in which the gingival profile is defined. By gingival profile is meant a surface topography of the gingiva. Thus, in certain embodiments of the present technology, the arch form 3D digital model with the reconstructed gingival portion may more accurately represent an actual anatomical profile of the gingiva, thereby allowing for determining an effective, comfortable and safe orthodontic treatment for the subject.

Further, the so determined arch form 3D digital model with the reconstructed gingival profile may allow for a more computationally efficient approach to applying textures and colours thereto for visualization thereof on a screen of a computer system.

The arch form 3D digital model with the reconstructed gingival profile may also allow for manufacture of an orthodontic appliance, such as an aligner. By means of the gingival reconstruction, the aligner thus produced may provide a more comfortable fit against the gingiva of the subject based on the improved anatomical correctness of the reconstructed gingival profile. In certain embodiments, a more efficient planning of material use for the manufacture of the aligner may also be achieved.

In certain embodiments, methods and systems of the present technology to determine the arch form 3D digital model including the reconstructed gingival profile may avoid the need for obtaining additional image data of the undefined portions using for example additional imaging steps or additional imaging techniques, such as CT/MR scans or a panoramic radiograph, for example.

According to a first broad aspect of the present technology, there is provided a method for reconstructing a gingival profile in an arch form 3D digital model of a subject, the method executable by a processor of an electronic device, the method comprising: acquiring, by the processor, the arch form 3D digital model of the arch form of the subject, the arch form 3D digital model including a tooth portion representative of a given tooth of the subject and a gingiva portion representative of adjacent gingiva around the given tooth, the gingiva portion including a defined gingiva region and an undefined gingiva region requiring reconstruction; generating, by the processor, a defined cross section of the arch form 3D digital model along a sagittal plane, the defined cross section extending through a longitudinal tooth axis of the given tooth and the defined gingiva region, the defined cross section including a tooth cross section profile, the tooth cross section profile including at least: a crown profile, the crown profile being indicative of at least a portion of a surface profile of a crown portion of the given tooth; and a gingiva profile, the gingiva profile being indicative of at least a portion of a surface profile of the adjacent gingiva; identifying, within the tooth cross section profile, based on a predetermined instruction, a set of reference points for generating a parametric curve defining at least a portion of the tooth cross section profile; generating, by the processor, using an interpolation algorithm, the parametric curve based on the set of reference points; generating, by the processor, a first undefined cross section of the arch form 3D digital model along the sagittal plane, the undefined cross section extending through the longitudinal tooth axis of the given tooth and the undefined gingiva region; constructing, by the processor, in the first undefined cross section, at least a portion of the parametric curve, thereby generating a first reconstructed gingival profile, and updating the arch form 3D digital model with the first reconstructed gingival profile; and storing, by the processor, the arch form 3D digital model including the reconstructed gingival profile.

In certain embodiments, the predetermined instruction for identifying the set of reference points comprises: determining, by the processor, the set of reference points based on a predetermined distance from the longitudinal tooth axis.

In certain embodiments, the set of reference points comprises a first reference point and a second reference point, the predetermined instruction for identifying the set of reference points comprises: determining, by the processor, the first reference point based on the longitudinal tooth axis, and the second reference point based on a predetermined distance from the first reference point.

In certain embodiments, the identifying the set of reference points comprises: determining, by the processor, a first reference point of the set of reference points at an intersection of the tooth curve with the gingiva profile, the first reference point defining a first reference axis parallel to the longitudinal tooth axis; determining, by the processor, a second reference point of the set of reference points at an intersection of the gingiva profile with a first reference circle centred at the first reference axis and having a first reference circle radius; and determining, by the processor, a third reference point of the set of reference points as an intersection of the gingiva profile with a second reference circle centred at the first reference axis and having a second reference circle radius.

In certain embodiments, the first reference circle radius of the first reference circle is determined such that the first reference point corresponds to a location of a gingival pocket.

In certain embodiments, the second reference circle radius is larger than the first reference circle radius.

In certain embodiments, the identifying the set of reference points comprises: determining, by the processor, a first reference point of the set of reference points, the first reference point comprising an off-set point of intersection of the tooth curve with the gingiva profile, the first reference point defining a first reference axis parallel to the longitudinal tooth axis; determining, by the processor, a second reference point of the set of reference points at an intersection of the gingiva profile with a first reference circle centred at the first reference axis and having a first reference circle radius; and determining, by the processor, a third reference point of the set of reference points as an intersection of the gingiva profile with a second reference circle centred at the first reference axis and having a second reference circle radius.

In certain embodiments, the method further comprising updating the gingiva profile to exclude a portion lying between (i) the intersection of the tooth curve with the gingiva profile, and (ii) the first reference point.

In certain embodiments, the generating the parametric curve comprises defining at least a portion of the gingiva profile.

In certain embodiments, the generating the parametric curve comprises: determining a preliminary parametric curve based on the set of reference points, the preliminary parametric curve comprising a set of preliminary curve parameters; determining a target function describing a degree of non-conformity of the parametric curve to the gingiva profile; and minimizing the target function to obtain an optimized parametric curve comprising a set of optimized curve parameters. In certain embodiments, the minimizing the target function comprises applying a gradient descent algorithm.

In certain embodiments, the generating the parametric curve comprises: determining a preliminary parametric curve based on the set of reference points, the preliminary parametric curve comprising a set of preliminary curve parameters; determining if there are missing curve parameters relating to the preliminary parametric curve, and determining each missing curve parameter by interpolating the preliminary curve parameters.

In certain embodiments, the method further comprises generating, by the processor, a second undefined cross section of the arch form 3D digital model along the sagittal plane, the second undefined cross section being spaced from the first undefined cross section and extending through the longitudinal tooth axis of the given tooth and the undefined region of the gingiva portion; and constructing, by the processor, in the second undefined cross section, a second reconstructed gingival profile by applying the determined parametric curve; and updating the arch form 3D digital model using the first second reconstructed gingival profile and the second reconstructed gingival profile.

In certain embodiments, the first undefined cross section and the second undefined cross section are radially spaced from each other about the longitudinal tooth axis.

In certain embodiments, the method further comprises generating, by the processor, a plurality of defined cross sections and a plurality of undefined cross sections, the plurality of defined cross sections and the plurality of undefined cross sections being radially spaced from each other about the longitudinal tooth axis; constructing, by the processor, in each one of the plurality of cross sections, a respective instance of the parametric curve; and constructing, based on a predetermined resolution value, a plurality of loft curves crossing respective instances of the parametric curve in each one of the plurality of cross sections, thereby defining a mesh of the arch form 3D digital model.

In certain embodiments, the plurality of cross sections are equally radially spaced from each other based on a predetermined angular step.

In certain embodiments, the generating the defined cross section comprises generating a plurality of defined cross sections radially spaced from each other relative to the tooth axis; the generating the parametric curve comprises generating, for each one of the plurality of defined cross section, a respective parametric curve; the method further comprises: analyzing a given parametric curve to determine a respective set of curvature parameters associated therewith; determining a combination amongst respective sets of curvature parameters associated with respective parametric curves; and based on the combination amongst the respective sets of curvature parameters, determining a normalized parametric curve; and wherein: the updating the arch form 3D digital model with the first reconstructed gingival profile comprises constructing, in each one of the plurality of cross sections of the arch form 3D digital model, a respective instance of the normalized parametric curve.

In certain embodiments, the determining the combination amongst the respective sets of curvature parameters comprises averaging respective parameters over the respective sets.

From another aspect, there is provided a system for reconstructing a gingival profile in an arch form 3D digital model of a subject, the system comprising a processor of an electronic device, the processor configured to execute a method. The method comprises acquiring, by the processor, the arch form 3D digital model of the arch form of the subject, the arch form 3D digital model including a tooth portion representative of a given tooth of the subject and a gingiva portion representative of adjacent gingiva around the given tooth, the gingiva portion including a defined gingiva region and an undefined gingiva region requiring reconstruction; generating, by the processor, a defined cross section of the arch form 3D digital model along a sagittal plane, the defined cross section extending through a longitudinal tooth axis of the given tooth and the defined gingiva region, the defined cross section including a tooth cross section profile, the tooth cross section profile including at least: a crown profile, the crown profile being indicative of at least a portion of a surface profile of a crown portion of the given tooth; and a gingiva profile, the gingiva profile being indicative of at least a portion of a surface profile of the adjacent gingiva; identifying, within the tooth cross section profile, based on a predetermined instruction, a set of reference points for generating a parametric curve defining at least a portion of the tooth cross section profile; generating, by the processor, using an interpolation algorithm, the parametric curve based on the set of reference points; generating, by the processor, a first undefined cross section of the arch form 3D digital model along the sagittal plane, the undefined cross section extending through the longitudinal tooth axis of the given tooth and the undefined gingiva region; constructing, by the processor, in the first undefined cross section, at least a portion of the parametric curve, thereby generating a first reconstructed gingival profile, and updating the arch form 3D digital model with the first reconstructed gingival profile; and storing, by the processor, the arch form 3D digital model including the reconstructed gingival profile.

In some implementations of the method, the arch form 3D digital model including the reconstructed gingival profile includes a plurality of mesh elements which are not ordered, and wherein the method further comprises re-ordering, by the processor, the plurality of mesh elements so that the plurality of mesh elements are more evenly ordered.

In some implementations of the method, the method further comprises generating, by the processor, an orthodontic treatment plan based on the as determined arch form 3D digital model including the reconstructed gingival profile.

In the context of the present specification, unless expressly provided otherwise, the term "orthodontic treatment" is broadly referred to as any type of medical intervention aimed at correcting malocclusions associated with the teeth of the patient or moving the patient's teeth for any reason, including surgical and non-surgical manipulations, such as, but not limited to, using one or more of aligners, brackets, multi-strand wires, strips, retainers, and plates. Further, the orthodontic treatment, as referred to herein, may be determined automatically by a software, based on image data and other inputs associated with the subject, or semi-automatically with input from a practitioner in the field of dentistry (such as an orthodontist, a maxillofacial surgeon, for example).

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
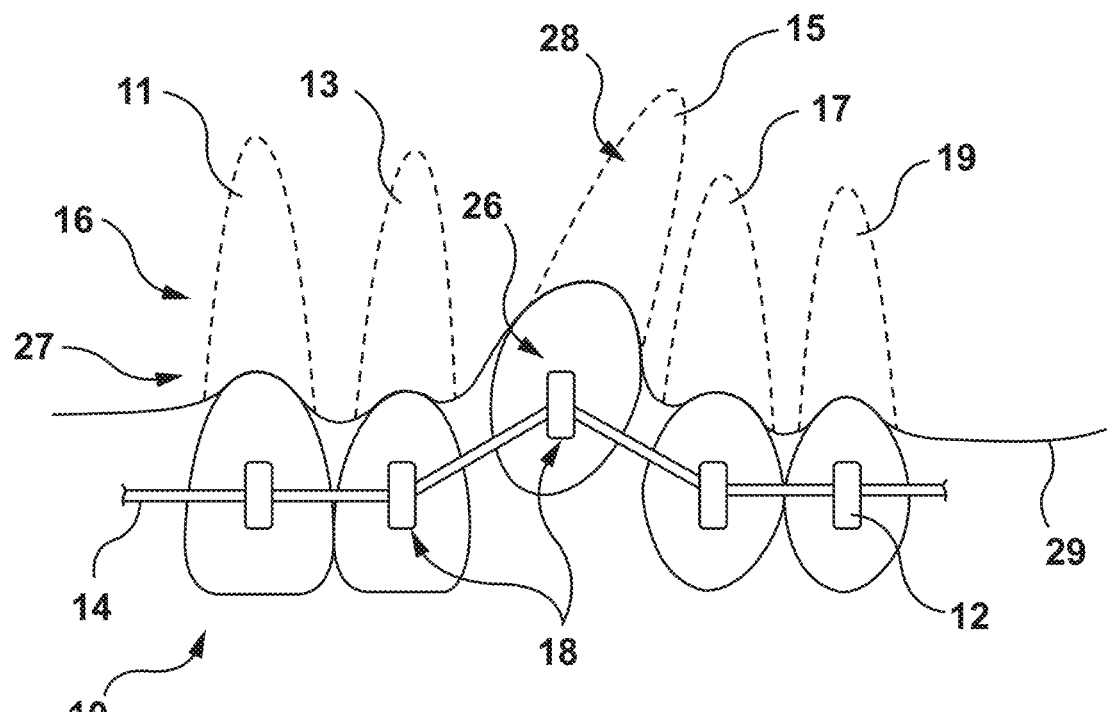
FIG. 1 depicts a schematic diagram of an orthodontic appliance attached to five teeth of a plurality of teeth in an upper arch form of a subject.

Certain aspects and embodiments of the present technology are directed to methods and systems for generating a 3D digital model of an arch form of a subject including a reconstructed gingival profile. The methods and systems may be based on a raw arch form 3D digital model including defined regions and undefined regions, such as one or more defined gingival profile regions in a gingiva portion of the arch form 3D digital model and undefined gingival profile regions in the gingiva portion. The subject may be receiving, or soon to receive, an orthodontic treatment. The arch form 3D digital model including the reconstructed gingival profile thus generated may be a more accurate representation of a profile of the gingiva of the subject compared to the raw arch form 3D digital model, and thus may allow for a more accurate planning of the orthodontic treatment. This can, in turn, improve overall safety, comfort and effectiveness of the orthodontic treatment as well as efficiency of manufacture of an orthodontic appliance which is part of the orthodontic treatment.

Certain non-limiting embodiments of the present technology minimize, reduce or avoid some of the problems noted in association with the prior art. For example, by implementing certain embodiments of the present technology in respect of generating the arch form 3D digital model, some or all of the following advantages may be obtained: (i) a more efficient and accurate approach to modelling movement of the subject's teeth based on a more realistic gingival profile and the forces that are thus required for the teeth movement; (ii) an ability to apply textures and colours to the generated arch form 3D digital model when viewed as a display on a screen of a computer system; (iii) relying on conventionally obtained image data only (e.g. intra-oral scanning) without the need for obtaining and processing additional image data associated with the subject, including, for example, CT and/or MR scans, or panoramic radiographs; and (iv) minimizing a number of occasions in which image data is required to be obtained. For example, the image data of the gingiva need only be obtained at the start of the orthodontic treatment, and not throughout.

Thus, methods and systems provided herein, according to certain non-limiting embodiments of the present technology, allow achieving a higher accuracy in planning and predictability of orthodontic treatments, and consequently, resolving malocclusions more efficiently and effectively whilst using more commonly available imaging techniques for generating the image data associated with the subject.

According to some non-limiting embodiments of the present technology, the methods for generating the arch form 3D digital model described herein may be considered as a stand-alone process. However, in other non-limiting embodiments of the present technology, these methods may be part of a more general process of generating a 3D digital model of a subject's arch form including that of teeth and gingiva and possible roots. Such a 3D digital model may be further used for determining the orthodontic treatment, for example, by displaying the reconstructed tooth to a practitioner using a display or by using a computer algorithm to generate the treatment plan based on the representation.

Certain aspects and embodiments of the present technology will now be described below with reference to example orthodontic treatments.

Orthodontic Treatment

Figure 2:
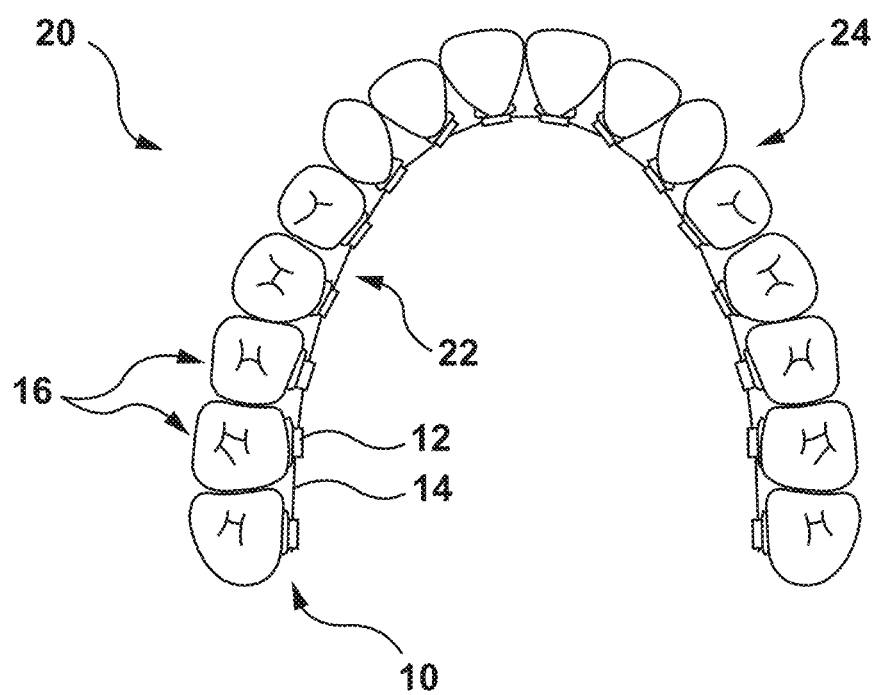
FIG. 2 depicts a schematic diagram of the upper arch form of the subject of FIG. 1 showing the orthodontic appliance of FIG. 1 attached thereto.

Referring initially to FIGS. 1 and 2, there is depicted an example orthodontic appliance 10 as part of the orthodontic treatment, to which certain aspects and embodiments of the present technology can be applied. Generally speaking, the orthodontic appliance 10 comprises brackets 12 and an archwire 14. The archwire 14 is made of a shape memory alloy such as Nitinol™, but can also be made of any other shape memory alloy or material having certain elasticity properties. The brackets 12 are respectively provided on some of upper teeth 16 (depicted individually as 11, 13, 15, 17, and 19), and the archwire 14 extends between, and is connected to each of the brackets 12. In the depicted embodiments of FIG. 1, the orthodontic treatment is aimed at misalignment of the tooth 15; hence the orthodontic appliance 10 is configured to cause the tooth 15 to move in a predetermined direction (such as downwardly) for alignment thereof with neighbouring ones of the upper teeth 16, that is, teeth 11, 13, 17, and 19. It will also be appreciated that the orthodontic appliance 10 may be used for treating any type of teeth misalignment or malocclusion, including but not limited to closing gaps ("space closure"), creating/widening gaps, tooth rotation, tooth intrusion/extrusion, and translation, to name a few.

As it can be appreciated from FIG. 1, the tooth 15 includes a crown portion 26 and a root portion 28. The root portion 28 extends into gingiva 27 surrounding the tooth 15. A gum line 29 defines a boundary of the gingiva 27 and the upper teeth 16.

The archwire 14 imposes a given force, caused by bends 18, on the tooth 15 at a respective one of the brackets 12 having been installed on the crown portion 26. Thus, due to the shape memory effect of the archwire 14, the tooth 15 will gradually move to an aligned position relative to the other one of the upper teeth 16. The bends 18 may have any suitable configuration.

With reference to FIG. 2, as one non-limiting example, the orthodontic appliance 10 has been applied to all the upper teeth 16 of an upper arch form 20 of the subject, with the brackets 12 being attached to an external surface of the upper teeth 16 on a lingual side 22 of the upper teeth 16. However, it should be noted that, in another non-limiting example, the orthodontic appliance 10 may be configured to be installed on an external surface on a buccal side 24 of the upper teeth 16. It should be expressly understood that, although the description herein is given in respect of the upper arch form 20 of the subject, it is for the sake of clarity and simplicity thereof, and in no way as a limitation. Non-limiting embodiments of the present technology can also apply to lower arch form and lower teeth.

It is contemplated that, according to some non-limiting embodiments of the present technology, the orthodontic appliance 10 may comprise orthodontic appliances of different types, shapes, sizes and configurations, such as, without limitation, multi-strand wires, strips, aligners, and plates.

Figure 3A:
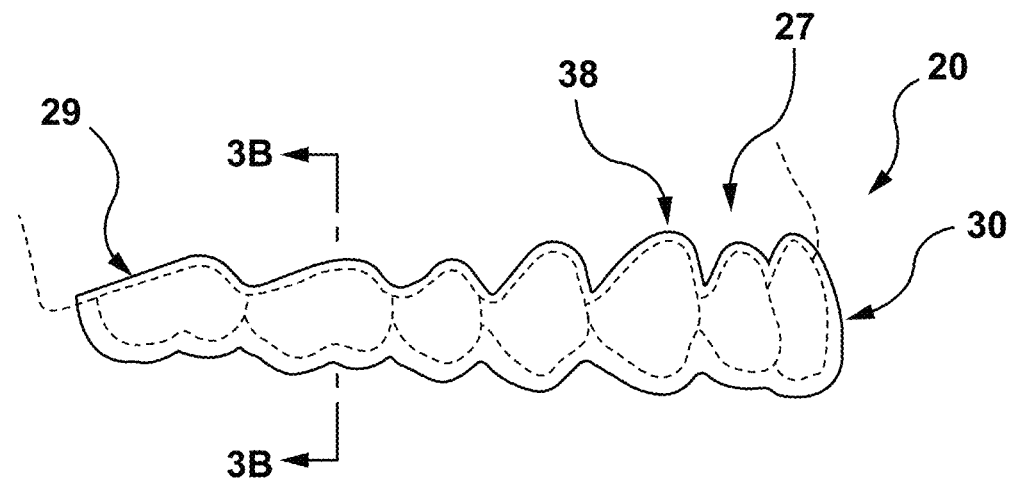
FIG. 3A depicts a side view of another type of orthodontic appliance applied to the upper arch form of the subject of FIG. 1.
Figure 3B:
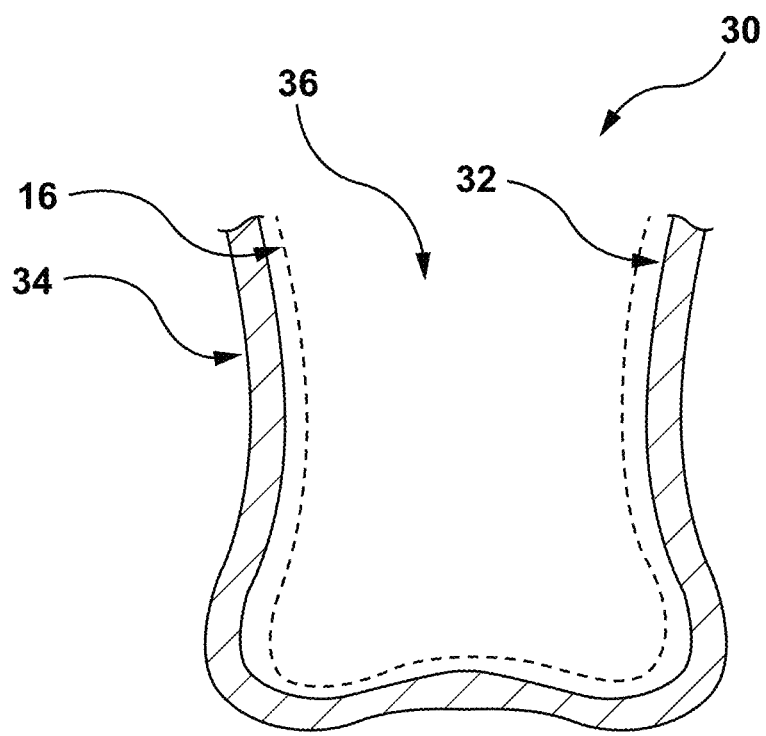
FIG. 3B is a cross-section of the orthodontic appliance of FIG. 3 through the line 3B-3B.

FIGS. 3A and 3B show an example aligner 30 as another example of the orthodontic appliance 10 that can be used in the orthodontic treatment plan, applied to the upper teeth 16, in accordance with certain non-limiting embodiments of the present technology. The aligner 30 comprises an inner surface 32 and an outer surface 34. The inner surface 32 defines a channel 36, which is configured for receiving the crown portions 26 of the upper teeth 16 including the teeth 11, 13, 17, and 19. At least one free edge 38 of the aligner 30 is shaped for following the gum line 29 along the gingiva 27. This may be an important consideration for comfort to the subject when wearing the aligner 30.

In accordance with the non-limiting embodiments of the present technology, a size, a form factor (such as a U-shape or a V-shape, for example), and a configuration of the aligner 30, including a material and a thickness thereof, depend generally on a particular malocclusion disorder of the patient or the determined orthodontic treatment for the malocclusion. As an example, in some non-limiting embodiments of the present technology, the thickness of the aligner 30 may be about 0.7 mm. In other non-limiting embodiments of the present technology, the thickness is selected from 0.7mm, 0.75 mm, 0.8 mm, 0.85 mm, 0.9 mm, 0.95 mm, and 1.0 mm. In yet other non-limiting embodiments of the present technology, the aligner 30 may have regions of variable thickness, such as interdental regions or ocular regions, as an example.

According to certain non-limiting embodiments of the present technology, the aligner 30 may be made of a polymer, such as a thermoplastic material. In other non-limiting embodiments of the present technology, the aligner 30 may be made of poly-vinyl chloride (PVC). In yet other non-limiting embodiments of the present technology, the aligner 30 may be made of polyethylene terephthalate glycol (PETG). Other suitable materials can also be used to form the aligner 30.

The aligner 30 is configured in such a way that its inner surface 32 is configured to impose a desired force on one or more of the upper teeth 16, when the aligner 30 is worn over the teeth, to obtain the target position of the one or more upper teeth 16 at a given stage of the orthodontic treatment.

It is contemplated that, before installing the orthodontic appliance 10 onto the upper teeth 16 for the alignment of the tooth 15, the orthodontic treatment should be determined, such as by modelling, to ensure that the tooth 15 will reach the aligned position efficiently, safely and without discomfort to the subject. To that end, image data indicative of crown portions and gingiva portions of the upper teeth 16 (such as the crown portion 26 of the tooth 15 and the gingiva 27) may be used to generate 3D digital models of the crown portions and the gingiva portions to determine the orthodontic treatment. The orthodontic treatment may be defined by one or more of: a magnitude of a given force to be applied to a given tooth, a direction of the given force on the given tooth, and an application location of the given force on the given tooth. The orthodontic treatment may also define a sequence of forces to be applied to the same or different teeth in one or more treatment segments. The treatment segments may comprise the same or different treatment times.

One consideration during the orthodontic treatment determination may include avoiding collisions between the teeth whilst they are being moved. Such collisions may result in damage to the colliding teeth such as chips or cracks in their crown portions, and possibly also pain to the subject. Therefore, ensuring that final positions of the teeth as well as intermediate positions of the teeth along a trajectory from the start to the final positions avoid collision is a factor for consideration.

Another consideration for the orthodontic treatment determination is ensuring that the applied force does not cause damage to the teeth structures, such as ligaments supporting the root portion 28, the gingiva 27, maxillary alveolar bone, proximal nerve pathways, blood vessels and the like. This can not only result in pain to the subject, but also loss of tooth anchoring and possibly tooth and/or bone loss. Considerations can also be made in respect of overall comfort of the orthodontic treatment for the subject, on which his or her tolerance and adherence to the orthodontic treatment may depend.

When a tooth, such as the tooth 15, is caused to move, such as by the brackets 12 or the aligner 30, the gingiva, such as the gingiva 27, surrounding the tooth may also shift. This shift in the gingiva is referred to herein as gingiva deformation. The way that the gingiva will be deformed in response to a tooth being shifted may be difficult to predict and/or model. The deformation of the gingiva may be important to model particularly around gum pockets and/or periodontal pockets in which the gingiva may be thinned and fragile. Safety in those thinned areas is a concern. The gingival deformation may also be important to model in terms of monitoring an accurate representation of a gum line, such as the gum line 29, which in the case of the orthodontic appliance 10 comprising the aligner 30, is important to a comfort of the aligner 30 in use. Therefore, in order to determine the efficacy, comfort and/or safety of a proposed orthodontic treatment, an operator may wish to determine the gingiva deformation that will occur if the treatment is applied and/or view a model of the predicted changes to the teeth and gingiva after applying the treatment. This would require an accurate representation of the gingiva.

Conventionally obtained image data taken at a particular moment in time of the crown portion and/or the gingiva may be insufficient for a comprehensive modelling and analysis of the gingiva profile and gingiva deformation. As mentioned above, certain portions of the gingiva may not be visible in the image data, and thus the gingival profile at those portions may be undefined in a 3D digital model derived from the image data.

Figure 4A:
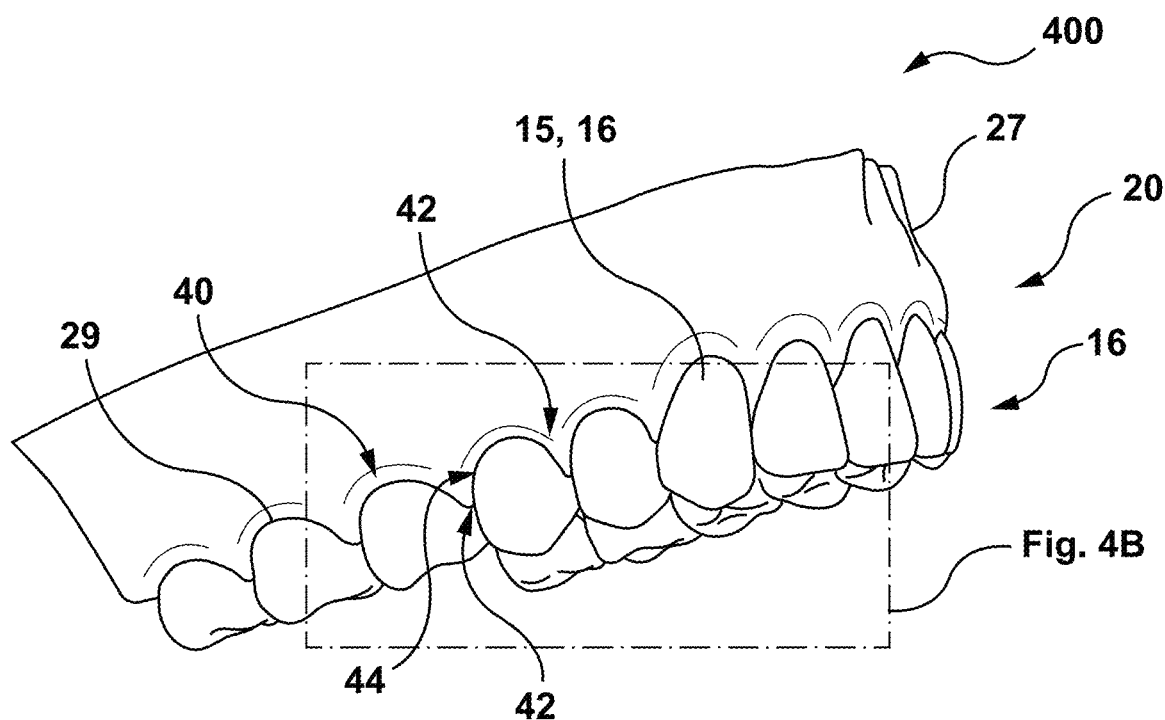
FIG. 4A depicts an arch form 3D digital model of the upper arch form of FIG. 1.

FIG. 4A depicts an example arch form 3D digital model 400 of the upper arch form 20 derived from image data of the upper arch form 20. The arch form 3D digital model 400 comprises a representation of the teeth 16 and the gingiva 27 based on image data. The arch form 3D digital model 400 includes at least one defined portion 40 in which the gum profile reflects the anatomical gum profile and at least one undefined portion 42 in which either there is no gum profile representation or the gum profile does not represent the anatomical gum profile. The undefined portion 42 may be located at an interdental region 44. Anomalies between the arch form 3D digital model 400 and the actual teeth 16 and the gingiva 27 may be attributable to artefacts created whilst capturing the image data and/or converting the image data. Such artefacts are also known as "digital garbage". In the context of the present specification, the term "artefacts" broadly refers to portions of an image of an object or a 3D digital model representation of the object forming no part of the real object and created, for example, due to errors introduced during imaging, such as using the imaging device 530. As such, for a more accurate representation of the real object, portions of the image with image artefacts need to be reconstructed.

In certain embodiments, instead of the arch form 3D digital model 400 of the upper arch form 20 including representations of the teeth 16 and the gingiva 27, the arch form 3D digital model 400 may include representations of only the teeth 16 or only the gingiva 27. For example, the arch form 3D digital model 400 may include representations of one or more of the upper teeth 16 only (representations of the gingiva 27 being absent), according to certain embodiments of the present technology. In addition to, or instead of, the arch form 3D digital model 400 may include representations of the gingiva 27 only (representations of the upper teeth 16 being absent), according to certain embodiments of the present technology. In certain embodiments, the representations of the gingiva 27 only, or the teeth 16 only may have been obtained by isolating representations of the teeth 16 from the gingiva 27 using one or more segmentation methods.

Figure 4B:
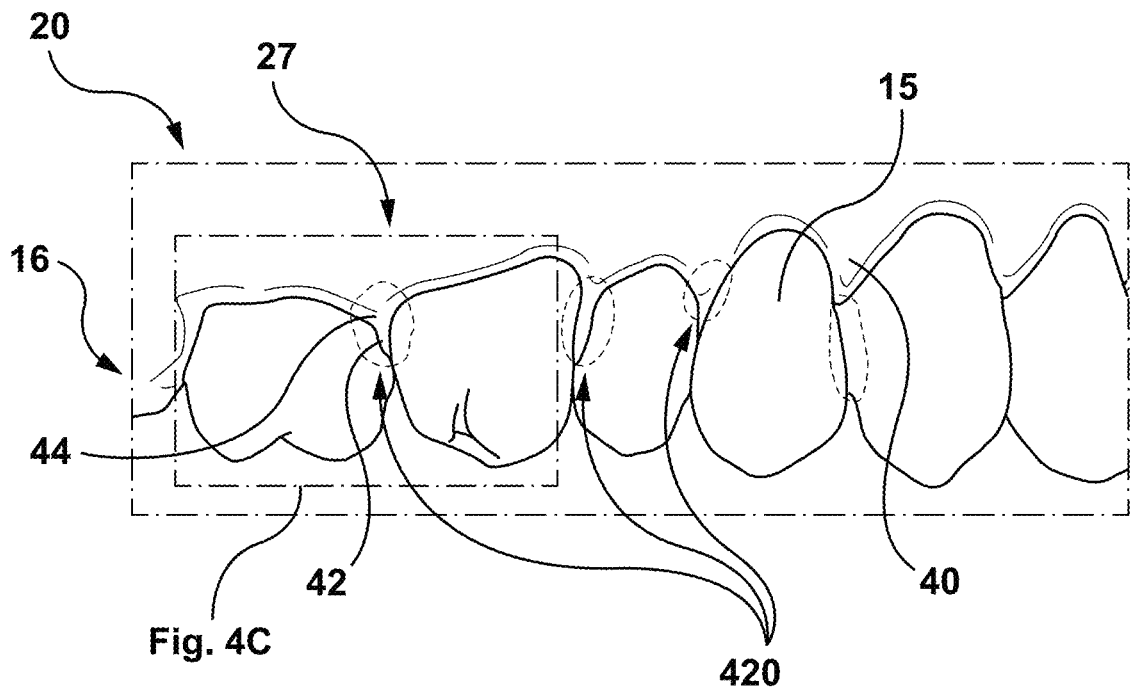
FIG. 4B depicts a close-up view of the arch form 3D digital model of FIG. 4A.

FIG. 4B depicts a zoomed-in view of a portion of the arch form 3D digital model 400 of FIG. 4A including a number of the interdental regions 44 which comprise the undefined portions 42 at the interdental spaces 44. As can be seen, the arch form 3D digital model 400 includes image artefacts at the undefined portions 42 instead of data indicative of the actual gingival profile.

Figure 4C:
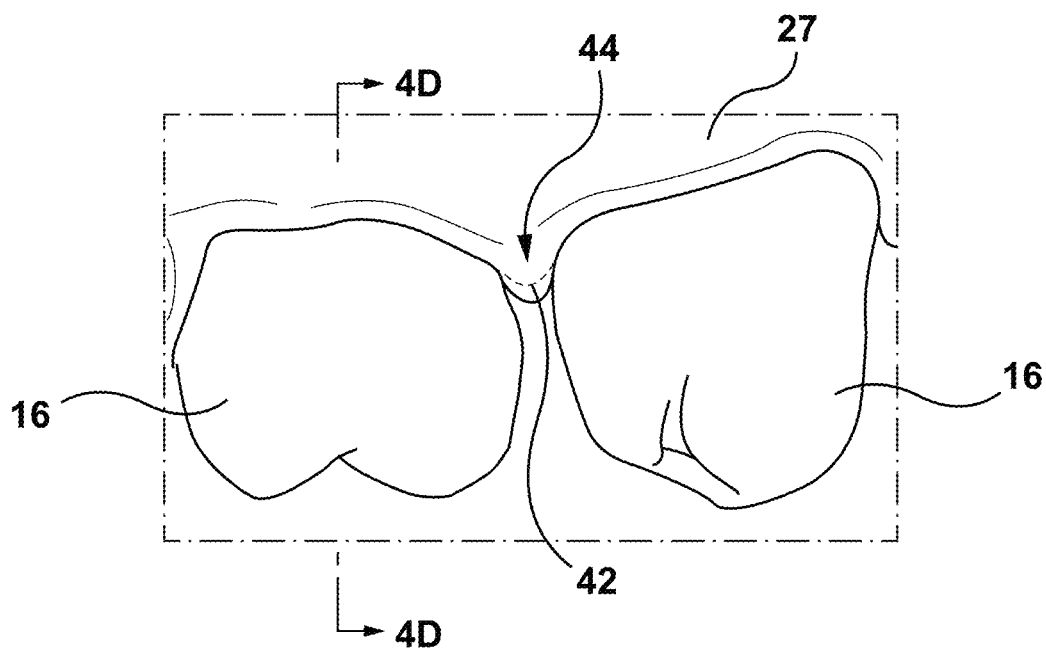
FIG. 4C depicts a close-up view of two teeth of the arch form 3D digital model of FIG. 4A.
Figure 4D:
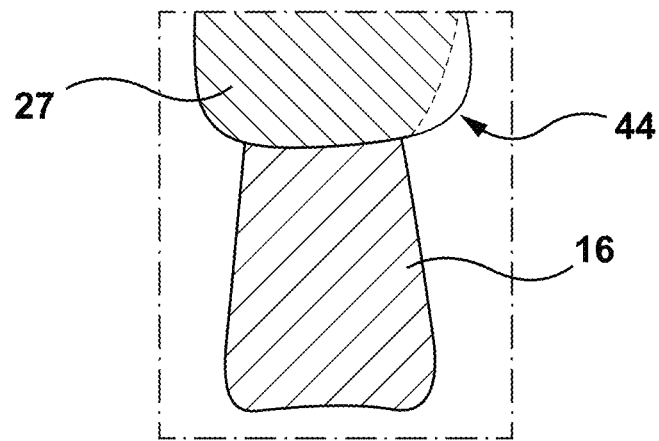
FIG. 4D is a cross-section of one of the teeth of FIG. 4C through line 4C-4C.

FIG. 4C depicts a further zoomed-in view of two of the teeth 16 and one interdental region 44 from FIG. 4B, and FIG. 4D is a cross-section through one of the teeth 16 and the surrounding gingiva 27 from FIG. 4C. The dotted lines illustrate a few of the possible gingival profiles in the undefined region 42.

As can be seen clearly from FIGS. 4A-4D, the so generated representation of the gingiva 27 in the arch form 3D digital model 400 may therefore not accurately represent an actual profile of the gingiva 27. It will be clear to persons skilled in the art that, in the absence of an accurate representation of the gingiva 27, and depending on which estimation of the gingival profile is taken into account, a resultant modeled movement of the teeth 16 may vary widely, and an orthodontic appliance designed for the modeled movement will not be comfortable or effective. Hence, it can be seen how it is important to determine the gingival profile accurately in the undefined regions.

How the arch form 3D digital model 400 from conventionally obtained image data of the arch form 20 may be used to generate an arch form 3D digital model including reconstructed portions of the undefined portions 42 of gingiva (also referred to as "arch form 3D digital model including reconstructed gingival profile") will be described below with reference to FIGS. 5 to 22.

System

Figure 5:
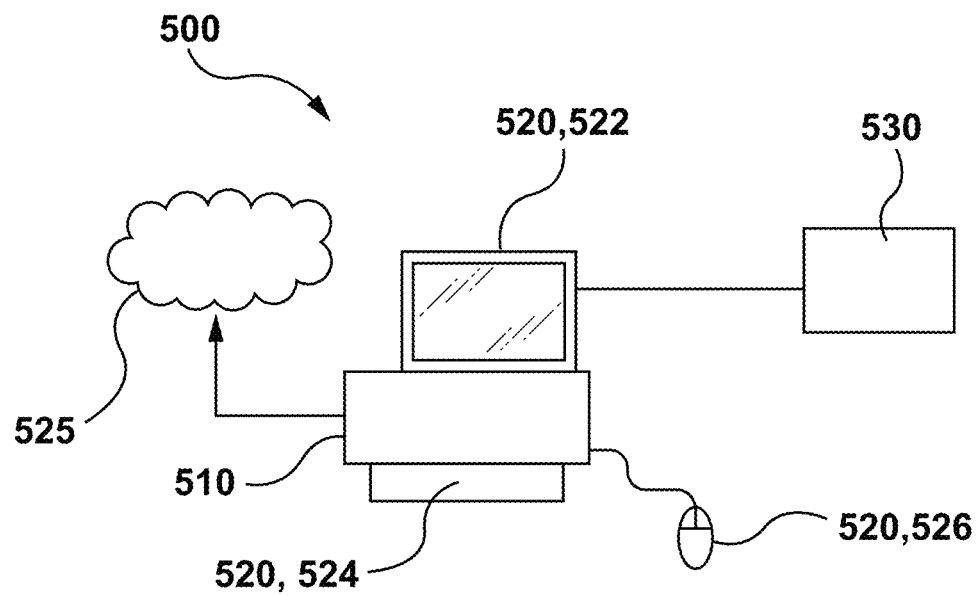
FIG. 5 depicts a schematic diagram of a system for reconstructing a gingival profile in an arch form 3D digital model, such as the arch form 3D digital model of FIG. 4A, in accordance with certain embodiments of the present technology.
Figure 6:
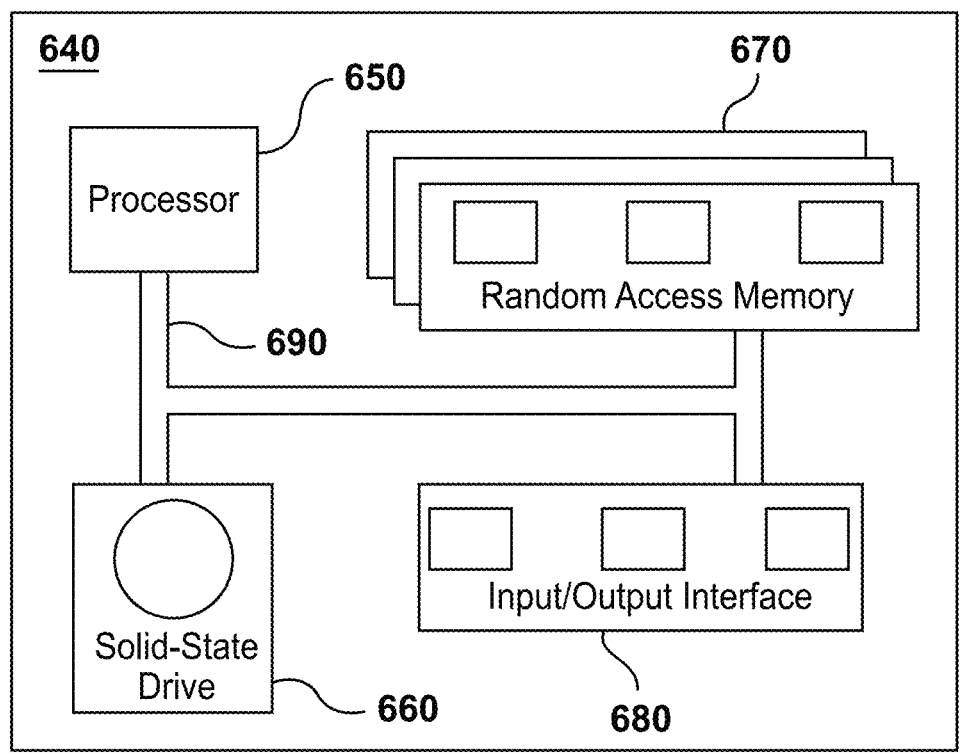
FIG. 6 depicts a schematic diagram of a computing environment of the system of FIG. 5, in accordance with certain embodiments of the present technology.
Figure 22A:
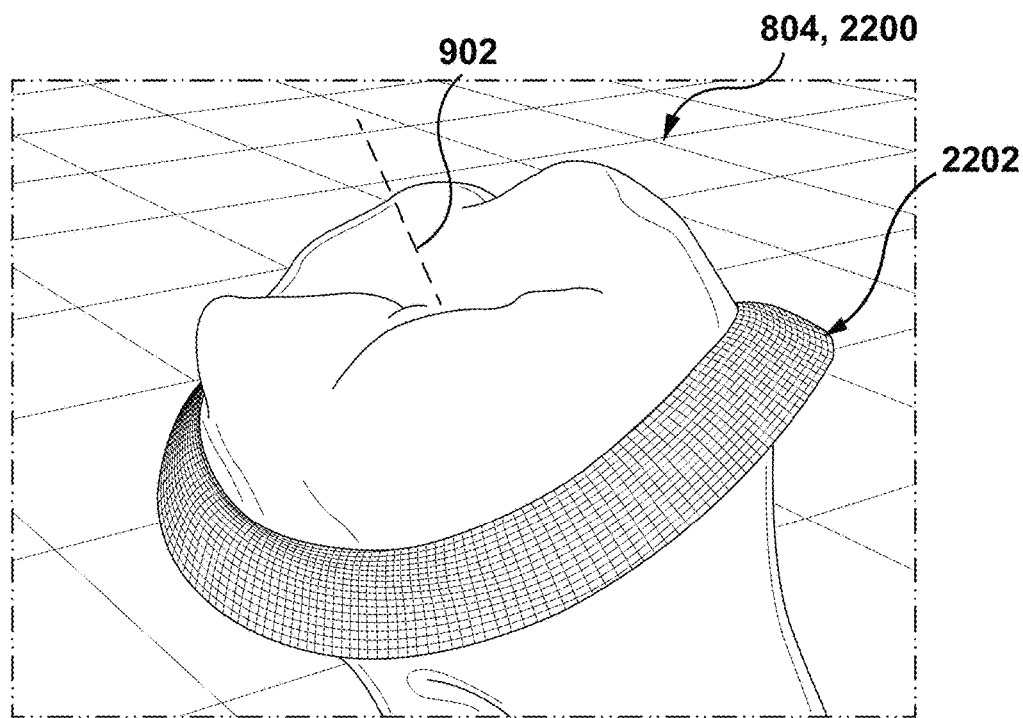
FIGS. 22A and 22B depict a perspective view of an updated tooth 3D digital model of the given tooth and an updated arch form 3D digital model of the upper arch form of the subject, respectively after applying the method for reconstructing the gingival profile of FIG. 7 to arch form 3D digital model of FIG. 4A, in accordance with certain non-limiting embodiments of the present technology.
Figure 22B:
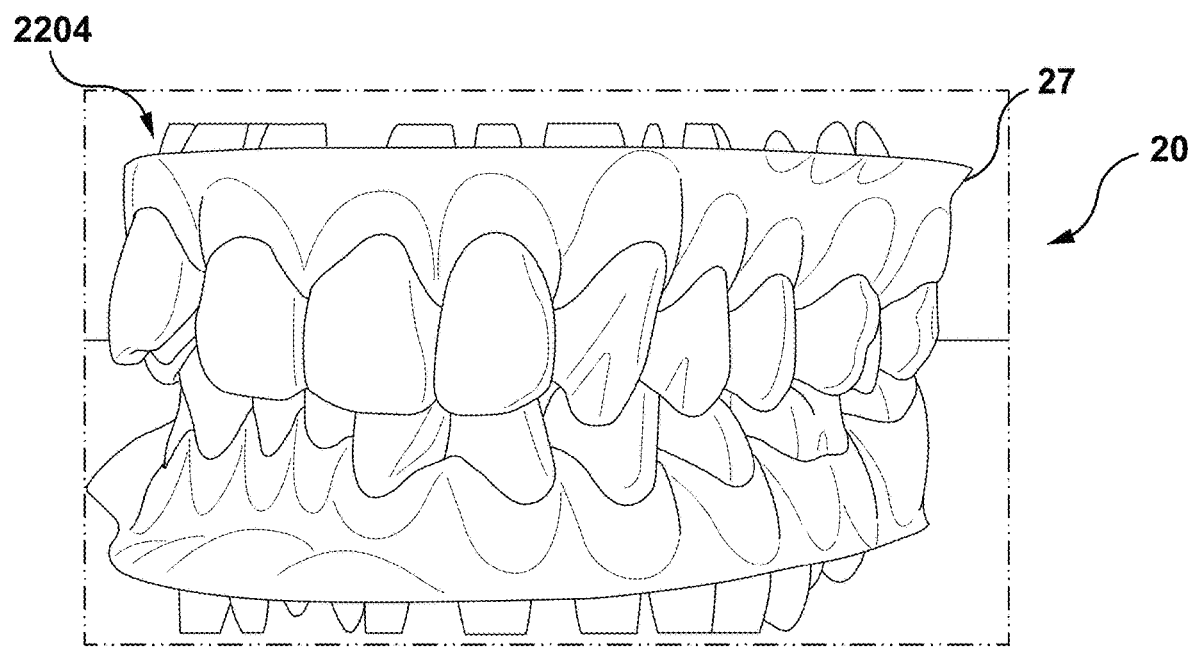

Referring to FIGS. 5 and 6, there is depicted a schematic diagram of a system 500 suitable for determining the arch form 3D digital model (such as an updated arch form 3D digital model 2204 depicted in FIG. 22B) including reconstructed portions thereof, in accordance with certain non-limiting embodiments of the present technology.

It is to be expressly understood that the system 500 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 500 may also be set forth below.

This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 500 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 500 of FIG. 5 comprises a computer system 510. The computer system 510 may be configured, by pre-stored program instructions, to generate, based on image data associated with the subject, the arch form 3D digital model including a reconstructed gingival profile according to certain non-limiting embodiments of the present technology. In some non-limiting embodiments of the present technology, the computer system 510 may further be configured to determine the orthodontic treatment for the subject, as will be described further It should be noted that in various non-limiting embodiments of the present technology, the computer system 510 may be configured to execute the methods separately and/or independently. Further, the order of these steps may be changed without departing from the scope of the present technology.

To that end, in some non-limiting embodiments of the present technology, the computer system 510 is configured to receive image data pertaining to the subject or to a given orthodontic treatment. For example, the computer system 510 may be configured to process the received image data to generate the arch form 3D digital model of the subject's arch form. According to some non-limiting embodiments of the present technology, the computer system 510 may receive the image data via local input/output interface (such as USB, as an example, not separately depicted). In other non-limiting embodiments of the present technology, the computer system 510 may be configured to receive the image data over a communication network 525, to which the computer system 510 is communicatively coupled.

In some non-limiting embodiments of the present technology, the communication network 525 is the Internet and/or an Intranet. Multiple embodiments of the communication network may be envisioned and will become apparent to the person skilled in the art of the present technology. Further, how a communication link between the computer system 510 and the communication network 525 is implemented will depend, inter alia, on how the computer system 510 is implemented, and may include, but is not limited to, a wire-based communication link and a wireless communication link (such as a Wi-Fi communication network link, a 3G/4G communication network link, and the like).

It should be noted that the computer system 510 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In alternative non-limiting embodiments of the present technology, the computer system 510 may be configured to receive the image data associated with the subject directly from an imaging device 530 communicatively coupled thereto. Broadly speaking the imaging device 530 may be configured (for example, by a processor 650 depicted in FIG. 6) to capture and/or process the image data of the upper teeth 16 and the periodontium of the subject. In certain non-limiting embodiments of the present technology, the image data may include, for example, one or more of: (1) images of external surfaces of respective crown portions (such as the crown portion 26 of the tooth 15) of the upper teeth 16, (2) images of an external surface of the periodontium including those of the gingiva 27, the alveolar maxillary bone, and images of superficial blood vessels and nerve pathways associated with the upper teeth 16; and (3) images of an oral region. By doing so, the imaging device 530 may be configured, for example, to capture image data of the upper arch form 20 of the subject. In another example, the imaging device 530 may also be configured to capture and/or process image data of a lower arch form associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 530 may comprise an intra-oral scanner enabling to capture direct optical impressions of the upper arch form 20 of the subject.

In a specific non-limiting example, the intraoral scanner can be of one of the types available from MEDIT, corp. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 530 may comprise a desktop scanner enabling to digitize a mold representing the upper arch form 20. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from Dental Wings, Inc. of 2251, ave Letourneux, Montréal (QC), Canada, H1V 2N9. It should be expressly understood that the desktop scanner can be implemented in any other suitable equipment.

Further, it is contemplated that the computer system 510 may be configured for processing of the received image data. The resulting image data of the upper arch form 20 received by the computer system 510 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 510 may further comprise a corresponding computing environment.

With reference to FIG. 6, there is depicted a schematic diagram of a computing environment 640 suitable for use with some implementations of the present technology. The computing environment 640 comprises various hardware components including one or more single or multi-core processors collectively represented by the processor 650, a solid-state drive 660, a random-access memory 670 and an input/output interface 680. Communication between the various components of the computing environment 640 may be enabled by one or more internal and/or external buses 690 (e.g. a PCI bus, universal serial bus, IEEE 1394 "Firewire" bus, SCSI bus, Serial-ATA bus, ARINC bus, etc.), to which the various hardware components are electronically coupled.

The input/output interface 680 allows enabling networking capabilities such as wire or wireless access. As an example, the input/output interface 680 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 680 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 660 stores program instructions suitable for being loaded into the random-access memory 670 and executed by the processor 650, according to certain aspects and embodiments of the present technology. For example, the program instructions may be part of a library or an application.

In some non-limiting embodiments of the present technology, the computing environment 640 is implemented in a generic computer system which is a conventional computer (i.e. an "off the shelf" generic computer system). The generic computer system may be a desktop computer/personal computer, but may also be any other type of electronic device such as, but not limited to, a laptop, a mobile device, a smart phone, a tablet device, or a server.

As persons skilled in the art of the present technology may appreciate, multiple variations as to how the computing environment 640 can be implemented may be envisioned without departing from the scope of the present technology.

Referring back to FIG. 5, the computer system 510 has at least one interface device 520 for providing an input or an output to a user of the system 500, the interface device 520 being in communication with the input/output interface 680. In the embodiment of FIG. 5, the interface device is a screen 522. In other non-limiting embodiments of the present technology, the interface device 520 may be a monitor, a speaker, a printer or any other device for providing an output in any form such as an image form, a written form, a printed form, a verbal form, a 3D model form, or the like.

In the depicted embodiments of FIG. 5, the interface device 520 also comprises a keyboard 524 and a mouse 526 for receiving input from the user of the system 500. Other interface devices 520 for providing an input to the computer system 510 can include, without limitation, a USB port, a microphone, a camera or the like.

The computer system 510 may be connected to other users, such as through their respective clinics, through a server (not depicted). The computer system 510 may also be connected to stock management or client software which could be updated with stock when the orthodontic treatment has been determined and/or schedule appointments or follow-ups with clients, for example.

As previously alluded to, according to the non-limiting embodiments of the present technology, the processor 650 may be configured to determine the updated arch form 3D digital model 2204 including the reconstructed gingival profile by performing one or more of the following steps: (1) receiving image data associated with the subject's arch form, such as the upper arch form 20 including the upper teeth 16 and the gingiva 27; (2) generate an arch form 3D digital model using the upper data, such as the arch form 3D digital model 400, being the raw arch form 3D digital model; (3) optionally segment the arch form 3D digital model 400 into portions thereof representative of individual teeth and respective portions of the gingiva 27 associated therewith; and (4) determine a reconstructed gingival profile associated with each individual tooth in the arch form 3D digital model 400.

The processor 650 may further be configured to perform one or more of: (1) in the arch form 3D digital model 400, identify defined regions of the gingiva portion and/or the tooth portion; (4) in the arch form 3D digital model 400, identify undefined regions of the gingiva portion and/or the tooth portion; (5) reconstruct the undefined regions of the gingiva portion and/or the tooth portion based on a determined profile in the defined region, thereby generating the updated arch form 3D digital model 2204; (6) optionally cause a manufacture of an orthodontic appliance based on the updated arch form 3D digital model 2204 including a reconstructed portion thereof; and (7) optionally determining an orthodontic treatment for the subject based on the updated arch form 3D digital model 2204 including the reconstructed portions thereof. For example, the processor 650 may be configured to determine a trajectory of movement of the tooth 15 towards the aligned position thereof, and a force for the trajectory, as described above with reference to FIGS. 1 to 3.

How these non-limiting embodiments can be implemented will be described with reference to FIGS. 7 to 22.

Methods

Figure 7:
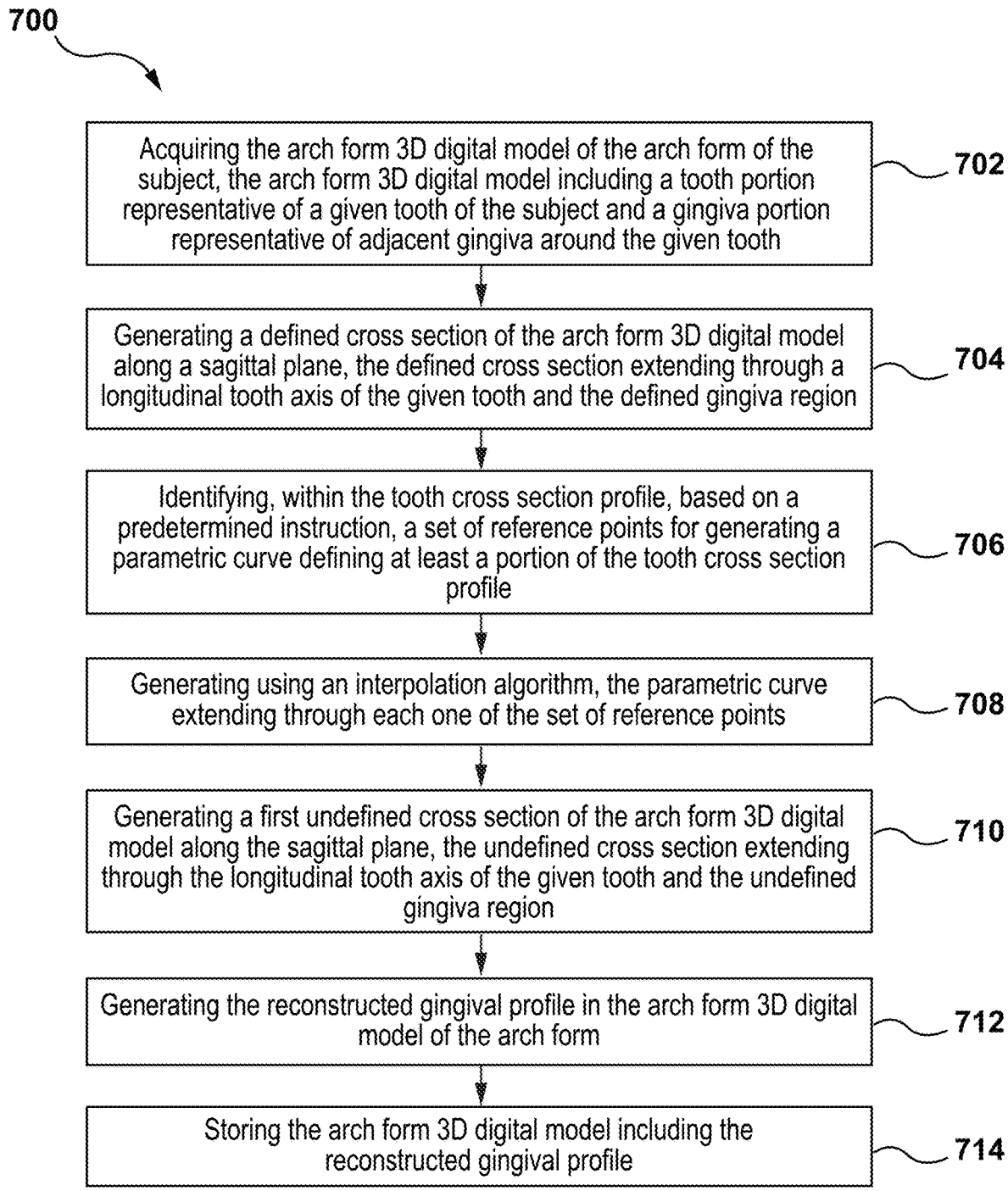
FIG. 7 depicts a flowchart diagram of a method for reconstructing a gingival profile in an arch form 3D digital model, such as the arch form 3D digital model of FIG. 4A, in accordance with certain non-limiting embodiments of the present technology.

With reference to FIG. 7, there is depicted a flowchart of a method 700 for generating the arch form 3D digital model, such as the updated arch form 3D digital model 2204 depicted in FIG. 22B, including the reconstructed gingival profile, according to an aspect of the present technology. According to certain non-limiting embodiments of the present technology, the method 700 can be executed by the processor 650 of the computer system 510.

Step 702: Acquiring an Arch Form 3D Digital Model of an Arch Form of a Subject, the Arch Form 3D Digital Model Including a Tooth Portion Representative of a Given Tooth of The Subject and a Gingiva Portion Representative of Adjacent Gingiva Around the Given Tooth The method 700 commences at step 702 with acquiring an arch form 3D digital model of an arch form of the subject, such as the arch form 3D digital model 400 of the upper arch form 20. The arch form 3D digital model 400 is a raw 3D representation of the upper arch form 20, in certain embodiments, meaning that it is directly based on image data of the arch form and without further processing such as to remove artefacts.

Figure 8:
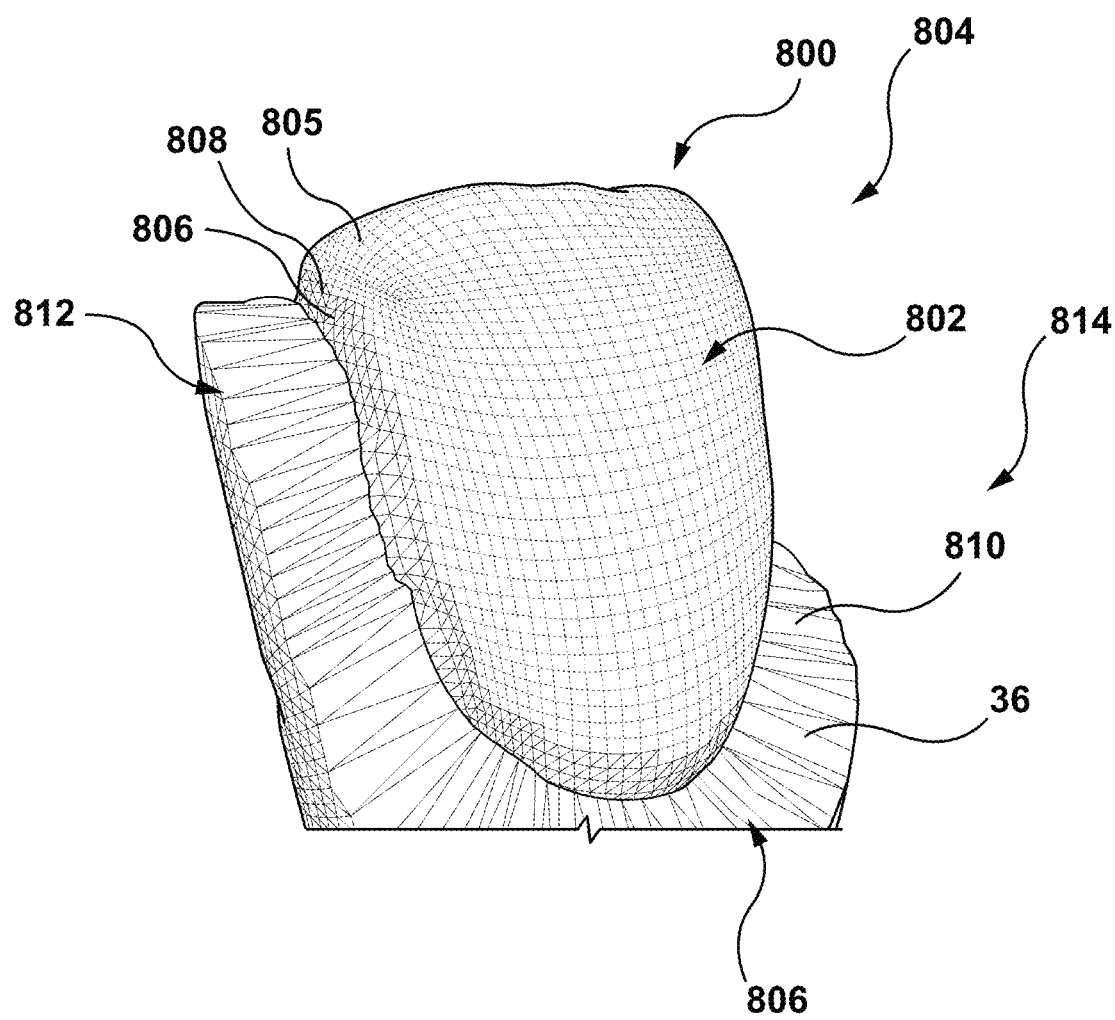
FIG. 8 depicts a close-up view of a tooth 3D digital model of a given tooth having been isolated from an arch form 3D digital model, such as the arch form 3D digital model of FIG. 4A, and depicting a representation of a tooth portion and gingiva portion of the given tooth, in accordance with certain non-limiting embodiments of the present technology.

As depicted in FIG. 8, in certain embodiments, the processor 650 is configured to acquire a tooth 3D digital model 800 of a given tooth 804 of the subject and a gingiva portion 806 representative of surface of adjacent gingiva around the given tooth 804. The given tooth 804 may comprise, for example, the tooth 11, the tooth 13, the tooth 15, the tooth 17 or the tooth 19 from FIG. 1. The tooth 3D digital model 800 may comprise at least a portion of the arch form 3D digital model 400.

The tooth 3D digital model 800 may have any appropriate format such as a mesh, a point cloud, etc. In certain embodiments, as shown in FIG. 8, the tooth 3D digital model 800 comprises a plurality of mesh elements 806 and vertices 808. The plurality of mesh elements 806 may include, without limitation, polygonal mesh elements such as triangular mesh elements or quadrilateral mesh elements. The polygonal mesh elements may be concave, convex or linear. In other embodiments, the tooth 3D digital model 800 may comprise a point cloud configuration. In certain embodiments, the mesh elements may be spaced irregularly from one another. In certain embodiments, the mesh elements may be randomly spaced.

In certain embodiments, the tooth 3D digital model 800 may have been retrieved by the processor 650 from a memory, such as the memory 670.

In certain embodiments, the tooth 3D digital model 800 may have been generated by the processor 650 from image data of a physical model representing the upper arch form 20.

In certain embodiments, the processor 650 may be configured to generate the tooth 3D digital model 800 from image data of the upper arch form 20. The image data may have been acquired by an imaging system such as the imaging device 530.

In certain embodiments, the tooth 3D digital model 800 may have been generated by an imaging system configured to acquire image data of the arch form 20, such as the imaging device 530.

In certain embodiments, the tooth portion 802 and the gingiva portion 806 of the given tooth 804 in the tooth 3D digital model 800 may be segmented from one another.

In some non-limiting embodiments of the present technology, the processor 650 may be configured to cause segmentation of the tooth 3D digital model 800 in order to determine at least one boundary between one or both of: (i) crown portions of adjacent teeth, and (ii) the given tooth 804 and the gingiva portion 806. The boundary between the given tooth 804 and the gingiva portion 806 may be representative of the gum line, such as the gum line 29.

How the processor 650 can be configured to isolate the crown portion is not limited; and, in some non-limiting embodiments of the present technology, the processor 650 can be configured to apply, to the tooth 3D digital model 800, one or more automatic tooth segmentation approaches described in a co-owned U.S. Pat. No.: 10,888,397-B1 issued on Jan. 12, 2021, entitled "METHOD AND SYSTEM FOR DENTAL BOUNDARY DETERMINATION", the content of which is incorporated herein by reference in its entirety.

In other non-limiting embodiments of the present technology, the processor 650 may be configured to automatic tooth segmentations as described in a co-owned U.S. Pat. No.: 10,695,147-B1, entitled "METHOD AND SYSTEM FOR DENTAL BOUNDARY DETERMINATION", issued Jun. 30, 2020; the content of which is hereby incorporated by reference in its entirety.

As can be appreciated from FIG. 8, the gingiva portion 806 of the tooth 3D digital model 800 includes a defined gingiva region 810 (such as the defined portion 40 of FIGS. 4A-4D) and an undefined gingiva region 812 (such as the undefined portion 42 of FIGS. 4A-4D). The undefined gingiva region 812 may comprise image artefacts 814 and require reconstruction.

Thus, the method 700 may also comprise the processor 650 identifying the defined gingiva region 810, and/or the undefined gingiva region 812. For example, the undefined gingiva region 812 may be identified by an unevenness of its profile. For example, the processor 650 can be configured to determine a given portion of the gingiva portion 806 as being associated with one of the defined gingiva region 810 and the undefined gingiva region 812 based on a degree of curvature deviation of a profile of the given portion of the gingiva portion 806 from an average curvature of a profile of the gingiva portion 806. To that end, the processor 650 can be configured, for example, to determine, within a respective cross section of the tooth 3D digital model 800, to distances (such as y coordinates) of certain points defining the profile of the given portion of the gingiva portion 806 and compare them to respective predetermined threshold values indicative of the average curvature of the profile of the gingiva portion 806.

However, in other non-limiting embodiments of the present technology, the defined gingiva region 810 and the undefined gingiva region 812 can be determined by an operator—such as by marking portions of the gingiva portion 806 that are perceived thereby as being part of the defined gingiva region 810 and the undefined gingiva region 812, respectively.

The method 700 hence advances to step 704.

Step 704: Generating a Defined Cross Section of the Arch Form 3D Digital Model

Figure 9:
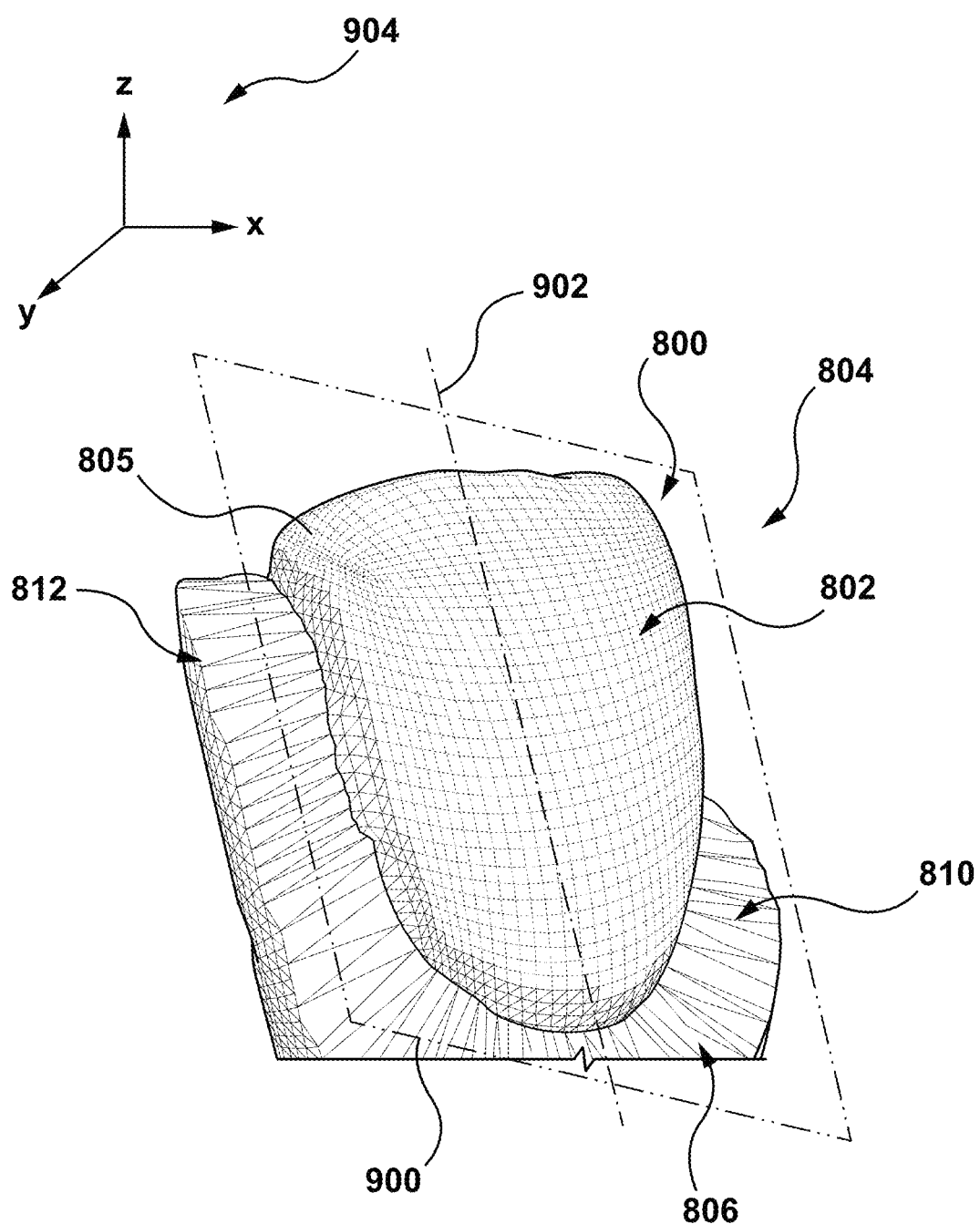
FIG. 9 depicts the close-up view of the tooth 3D digital model of FIG. 8 and including a depiction of a defined gingiva region and an undefined gingiva region of the gingiva portion of the given tooth, in accordance with certain non-limiting embodiments of the present technology.

In step 704, the method 700 comprises the processor 650 generating a defined cross section 900 of the tooth 3D digital model 800 through the given tooth 804 (FIG. 9).

The defined cross section 900 is along a longitudinal plane (in other words a sagittal plane of the subject) of the given tooth 804 and extends through a longitudinal tooth axis 902 of the given tooth 804. The defined cross section 900 extends through the tooth portion 802 and the defined gingiva region 810 of the gingiva portion 806. In some non-limiting embodiments of the present technology (not depicted), the defined cross section 900 can extend only through a portion of the tooth portion 802 and the defined gingiva region 810, such as along the longitudinal tooth axis 902. The longitudinal tooth axis 902 may be expressed as an infinite line with a known direction from a root portion (such as the root portion 28) to a crown portion (such as the crown portion 26) of the given tooth 804. In certain embodiments, the longitudinal tooth axis 902 may be expressed as a point and a vector, or two points with one closer to a coordinate system 904 with a z axis facing a crown portion direction. The longitudinal tooth axis 902 may have been determined, or obtained, in any manner.

Figure 10:
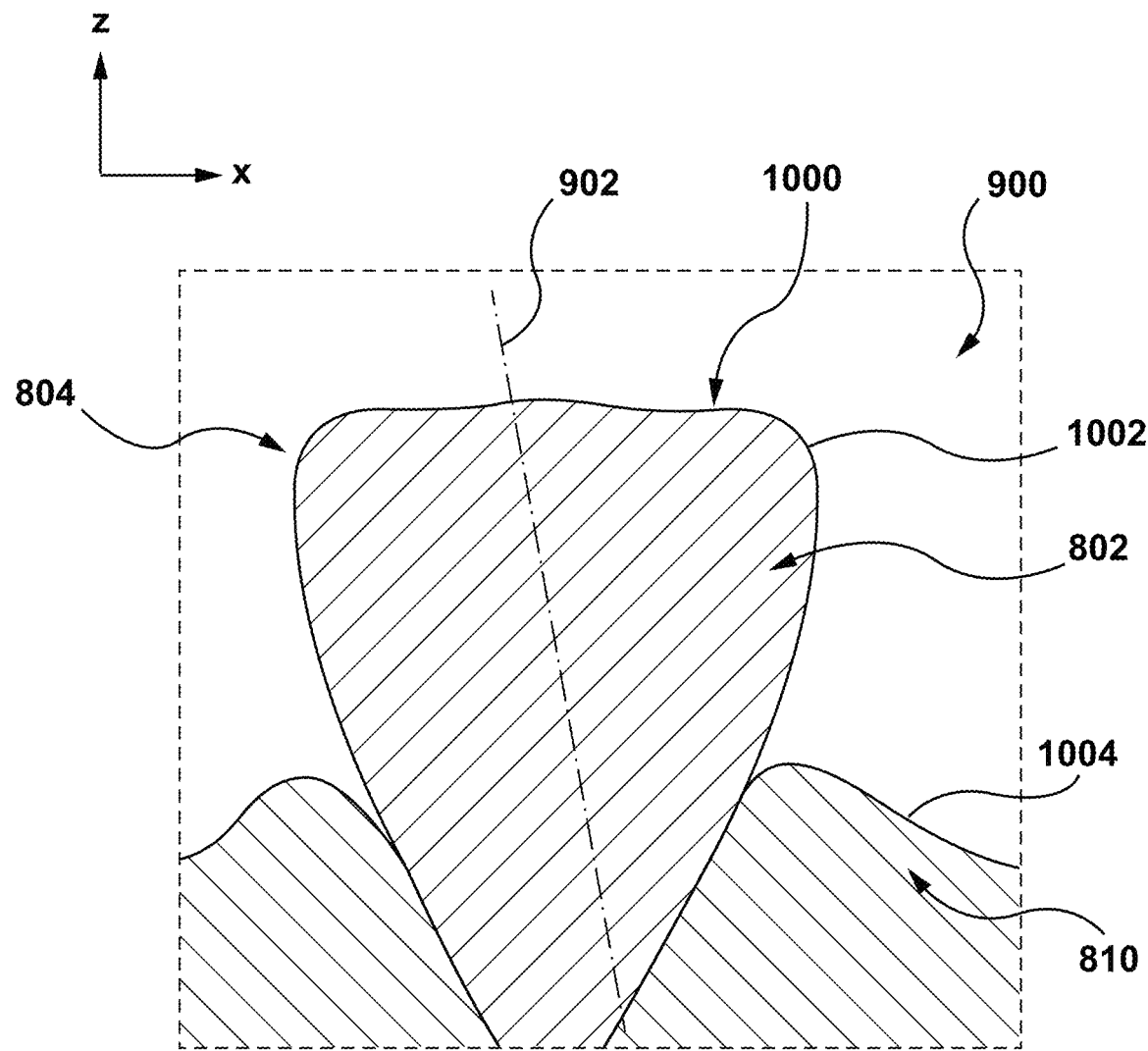
FIG. 10 depicts a defined cross section of the tooth 3D digital model of FIG. 9 through the defined gingiva region, in accordance with certain non-limiting embodiments of the present technology.

As best seen in FIG. 10, the defined cross section 900 includes a cross section of the given tooth 804, the cross section of the given tooth 804 having a tooth cross section profile 1000. The tooth cross section profile 1000 including:

a crown profile 1002 indicative of at least a portion of a surface profile of a crown portion of the given tooth; and a gingiva profile 1004 indicative of at least a portion of a surface profile of the gingiva adjacent to the given tooth 804. In other embodiments, the defined cross section 900 may include the gingiva profile 1004 only.

The method 700 hence advances to step 706.

Step 706: Identifying Within The Tooth Cross Section Profile, Based On A Predetermined Instruction, A Set Of Reference Points For Generating A Parametric Curve Defining At Least A Portion Of The Tooth Cross Section Profile At step 706, according to certain non-limiting embodiments of the present technology, having identified the tooth cross section profile 1000 of the given tooth 804, the processor 650 may be configured to identify, within the tooth cross section profile 1000, a set of reference points for generating a parametric curve defining at least a portion of the tooth cross section profile 1000. The set of reference points may be based on a predetermined instruction. The set of reference points are positioned along the tooth cross section profile 1000, such as on the gingiva profile 1004.

Figure 11:
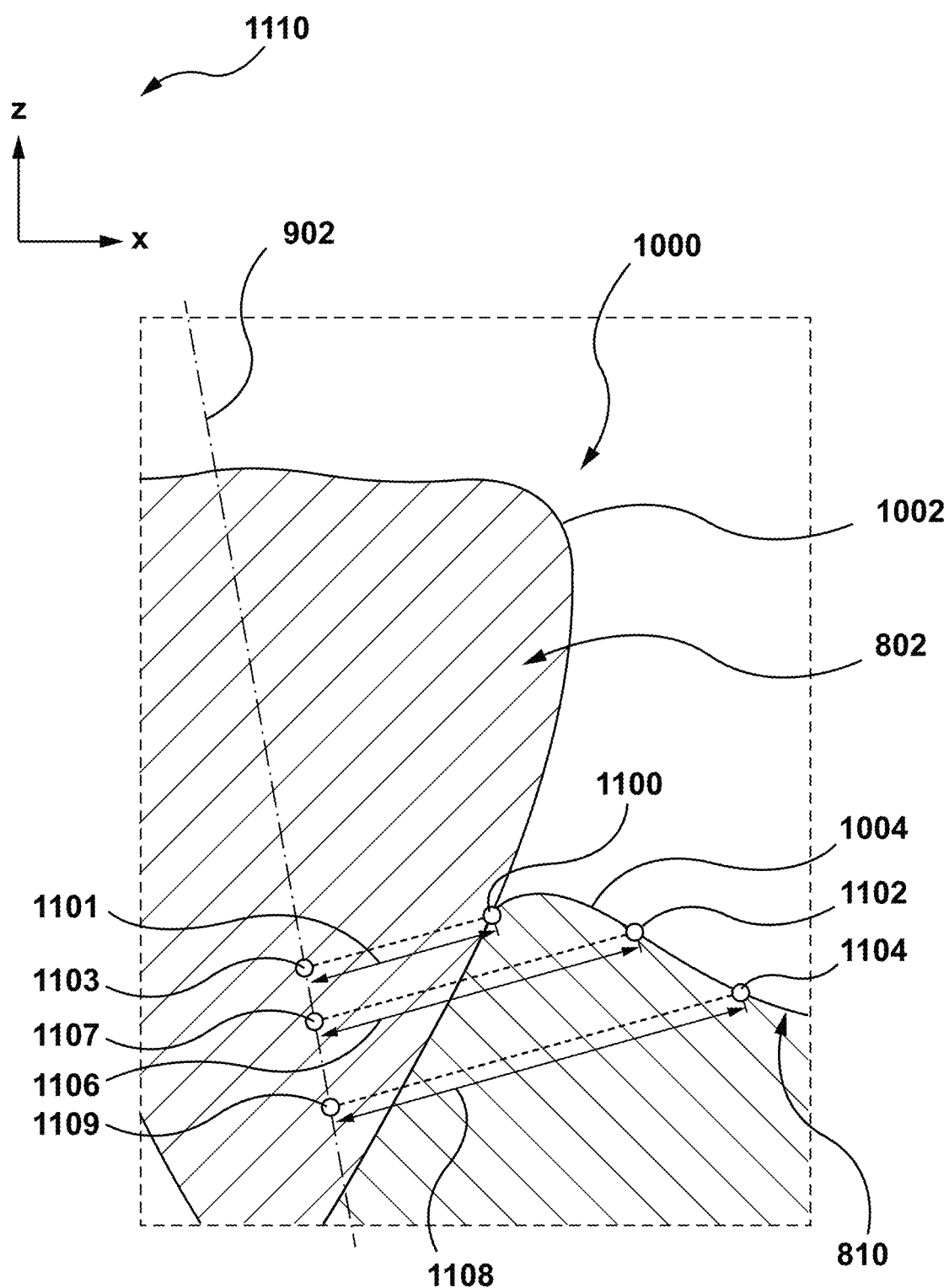
FIG. 11 depicts a portion of the defined cross section of the tooth 3D digital model of FIG. 10 and including reference points on the gingiva portion, in accordance with certain non-limiting embodiments of the present technology.
Figure 12:
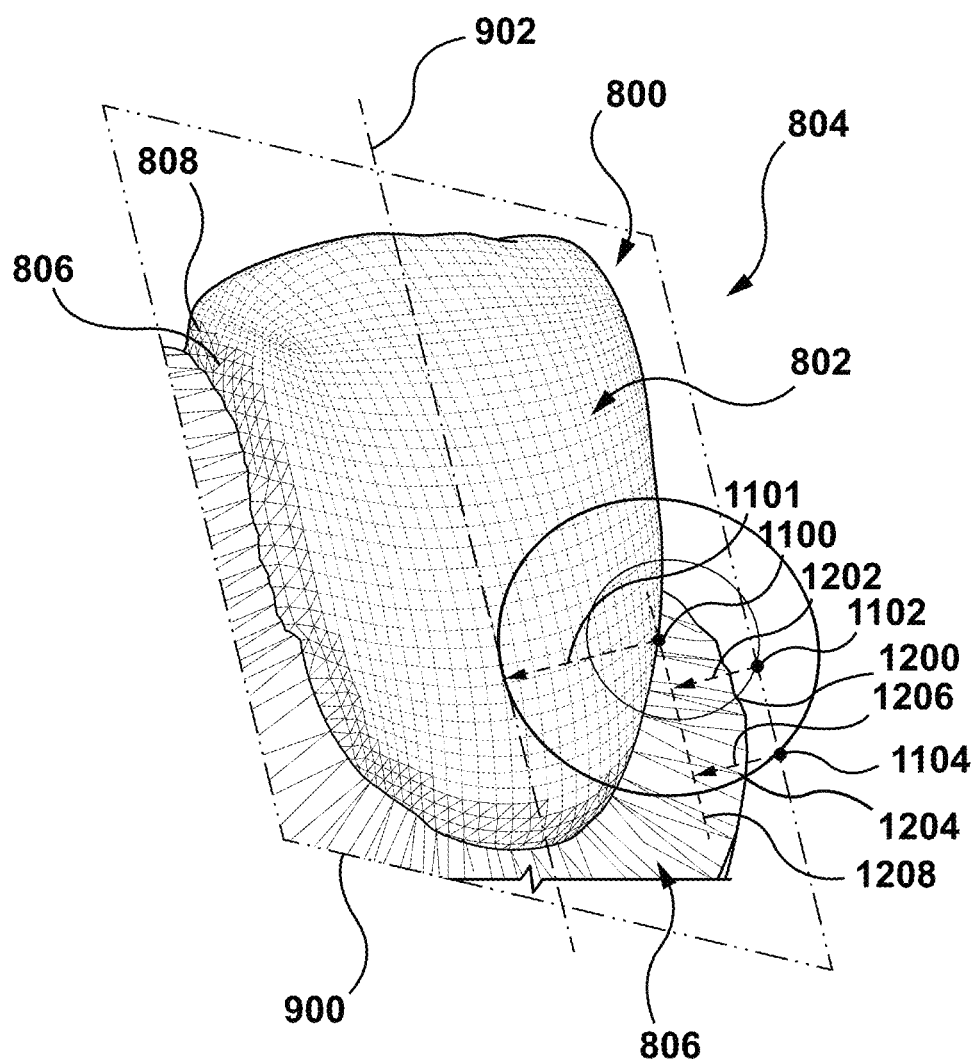
FIG. 12 depicts the close-up view of the tooth 3D digital model of FIG. 9 and including reference circles for determining at least some of the reference points, in accordance with certain non-limiting embodiments of the present technology.
Figure 13:
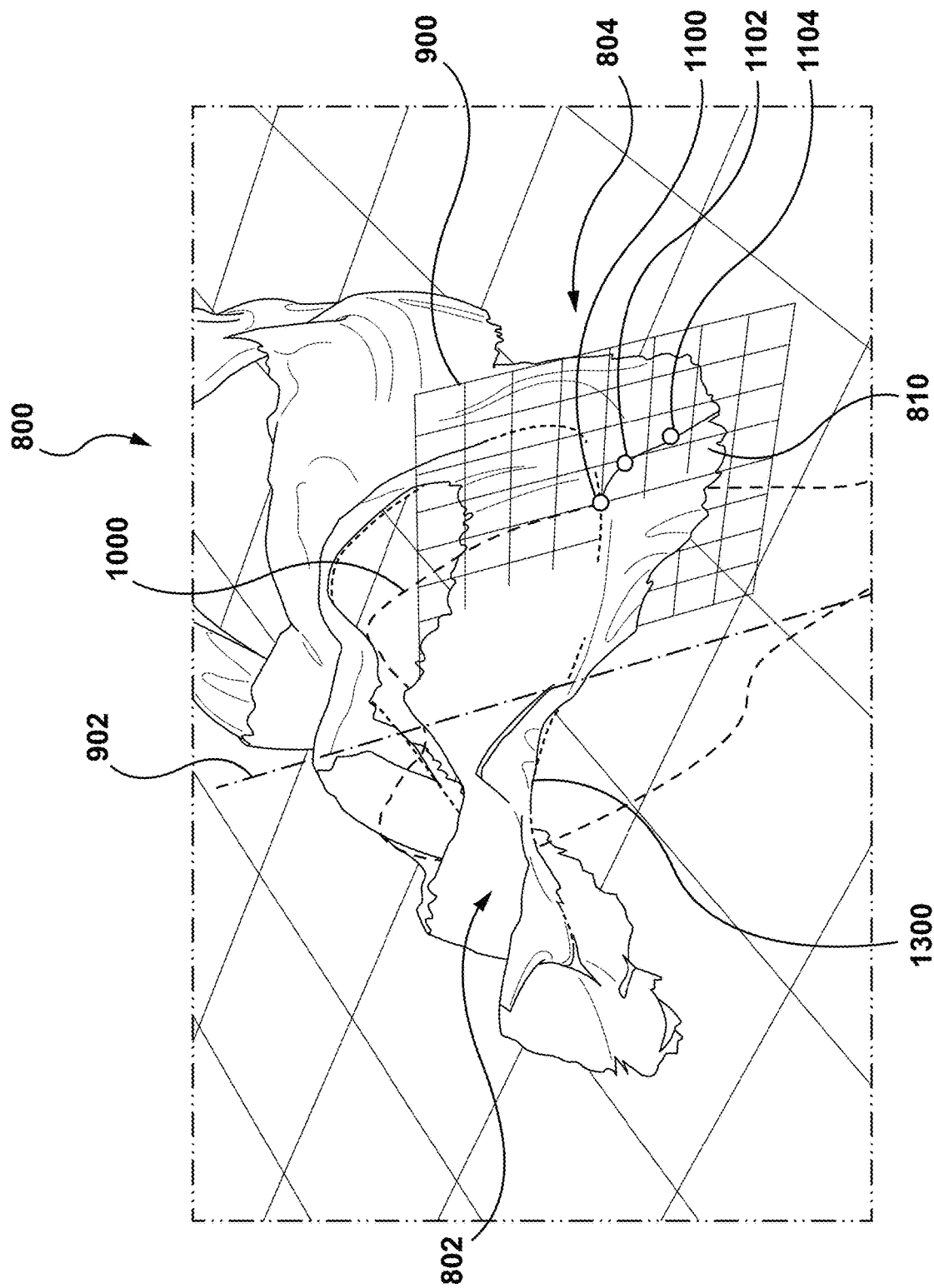
FIG. 13 depicts another close-up view of the tooth 3D digital model of the given tooth and depicting a representation of the tooth portion and the gingiva portion of the given tooth, a segmentation loop, a defined cross section of the arch form as well as reference points for defining a parametric curve, in accordance with certain non-limiting embodiments of the present technology.

For example, referring to FIGS. 11-13, there is shown a portion of the tooth cross section profile 1000 of FIG. 10 with a first reference point 1100, a second reference point 1102 and a third reference point 1104. The reference points may be defined using a coordinate system 1110, a distance along the longitudinal tooth axis 902 being a z coordinate. It will be appreciated that in other embodiments, there may be more or less than three reference points in the set of reference points.

In certain embodiments, the first reference point 1100 is at a first location, the first location being an intersection of the crown profile 1002 with the gingiva profile 1004. This may be determined, in certain embodiments, by obtaining a segmentation loop 1300 defining a boundary (e.g. corresponding to the gum line 29) between the crown portion 1002 and the gingiva portion 1004 of the given tooth 804 according to the methods described above. The first location is thus determined as being on the segmentation loop 1300 (see FIG. 13). The first reference point 1100 is at a first transverse distance 1101 from the longitudinal tooth axis 902, and a first longitudinal distance 1103 along the longitudinal tooth axis 902. The first longitudinal distance 1103 may be considered as a zero-reference point.

In certain embodiments, the second reference point 1102 is at a second location, the second location being on the gingiva profile 1004. The second reference point 1102 may be located transverse to the longitudinal tooth axis 902 in the defined cross section 900, and defined by a second transverse distance 1106 from the longitudinal tooth axis 902 and a second longitudinal distance 1107 along the longitudinal tooth axis 902. The second reference point 1102 may be spaced further from the longitudinal tooth axis 902 than the first reference point 1100. The second location may be defined as being at a gingival pocket of the given tooth 804. In certain embodiments, the second location of the gingival pocket may be determined according to empirical data of average locations of gingival pockets in subjects.

In certain embodiments, the third refence point 1104 is at a third location on the gingiva profile 1004. The third reference point 1104 may be located transverse to the longitudinal tooth axis 902 in the defined cross section 900, and defined by a third transverse distance 1108 from the longitudinal tooth axis 902 and a third longitudinal distance 1109 along the longitudinal tooth axis 902. The third reference point 1104 may be positioned further from the longitudinal tooth axis 902 than the second reference point 1102.

Referring to FIG. 12, in other embodiments, one or more of the first reference point 1100, the second reference point 1102 and the third reference point 1104 may be defined based on an intersection of one or more reference circles with the gingiva profile 1004. Each reference circle may lie on a plane which is transverse to the longitudinal tooth axis 902. The reference circles may be parallel to one another. Each reference circle has a reference circle radius.

As seen in FIG. 12, according to certain embodiments, only the second reference point 1102 and the third reference point 1104 are defined by reference circles, each reference circle being centered at the first reference point 1100. In other words, a first reference circle 1200 and a second reference circle 1204 are centered about an axis 1208 which is parallel to the longitudinal tooth axis 902 and spaced therefrom by the first transverse distance 1101.

For example, the second reference point 1102 is defined, in certain embodiments by an intersection of the gingiva profile 1004 with a first reference circle 1200 having a first reference circle radius 1202. The first reference circle 1200 may be combined with the arch form 3D digital model 400, the defined cross section 900 of the arch form, or the tooth cross section profile 1000.

In certain embodiments, the first reference circle 1200 may be determined such that it coincides with a gingival pocket of the given tooth 804 of the subject. In this respect, in certain embodiments, as mentioned above, the first reference circle radius 1202 may be determined empirically, such as by averaging data over a sample of subjects. This region coinciding with the gingival pocket of the given tooth 804 may be taken into consideration when planning an orthodontic treatment of the subject, such as by ensuring that this region is not to be deformed during the orthodontic treatment. This region may also be taken into account in embodiments of the present technology by identifying this area as not requiring gingival reconstruction.

In certain embodiments, the third location of the third reference point 1104 is defined by an intersection with the gingiva profile 1004 of a second reference circle 1204 having a second reference circle radius 1206. The second reference circle radius 1206 may correspond to the second distance 1108. The second reference circle 1204 may be combined with the arch form 3D digital model 400, the defined cross section 900 of the arch form, or the tooth cross section profile 1000.

In certain embodiments, the second reference circle 1204 represents an area around the given tooth 804 for which gingival reconstruction is required. The second reference circle radius 1206 may be determined so as to correspond to regions of the gingiva which may be hidden due to teeth misalignment. Accordingly, in certain embodiments, the second reference circle radius 1206 may be determined empirically, such as by averaging data over a sample of subjects.

In certain embodiments, a region between the first reference circle 1202 and the second reference circle 1204 may be used to model a deformation of the gingiva during orthodontic treatment.

In certain other embodiments, instead of the first and second reference circles 1200, 1204 being centered at the first reference point 1100, they may be centered at the longitudinal tooth axis 902 (not shown).

Figure 14:
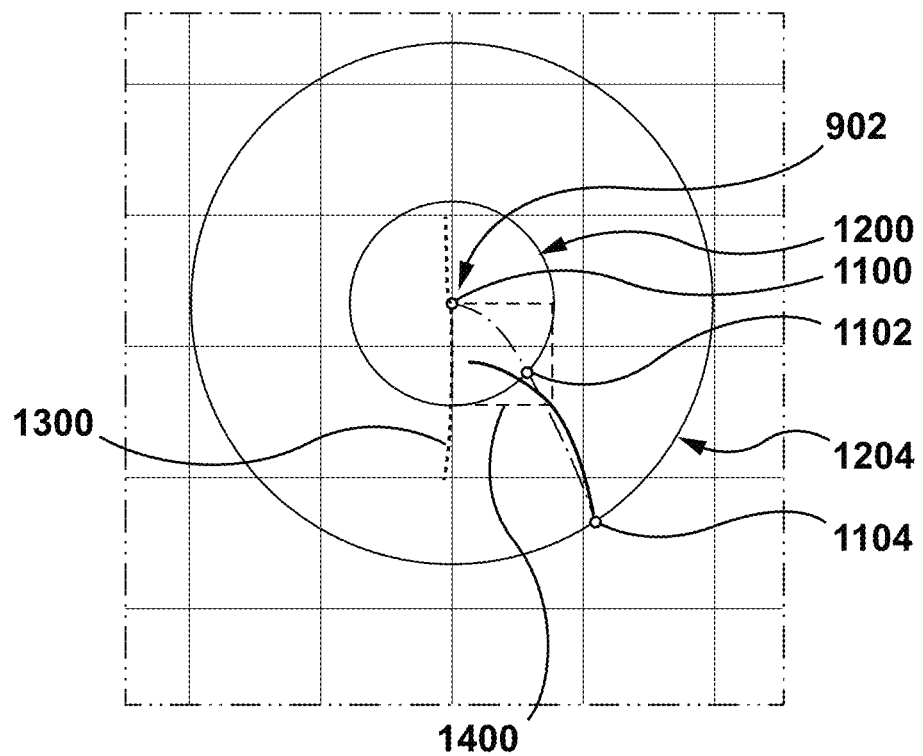
FIG. 14 depicts a cross-sectional view, along the defined cross section of FIG. 13, of the reference circles and the reference points of FIG. 12, in accordance with certain non-limiting embodiments of the present technology.

Referring to FIG. 14, there is shown a depiction of the determination of the second reference point 1102 and the third reference point 1104 using the first reference circle 1200 and the second reference circle 1204, in accordance with certain embodiments. FIG. 14 shows a top plan view of the first reference circle 1200 with the second reference point 1102 thereon and the second reference circle 1204 with the third reference point 1104 thereon. The first reference point 1100, which is determined as being on the segmentation loop 1300, is centrally positioned with respect to the first reference circle 1200 and on the longitudinal tooth axis 902.

In certain embodiments, the method 700 comprises the processor 650 projecting the first reference point 1100 on the longitudinal tooth axis 902 to obtain its position on the longitudinal tooth axis 902. In this respect, the projected point of the first reference point 1100 on the longitudinal tooth axis 902 is taken as a zero reference point, with positive and negative extending in opposite directions along the longitudinal tooth axis 902 therefrom. From the first reference point 1100, the processor 650 may then build the first reference circle 1200 with the first reference point 1100 at its center. In certain embodiments, the first reference circle radius 1202 is 0.8 mm.

In other embodiments, the first reference circle radius 1202 may be 0.6 mm, 0.7 mm, 0.9 mm or 1.0 mm.

The second reference point 1102 is then located on the first reference circle 1200. In certain embodiments, the processor 650 may first identify a quadrant of interest 1400 of the first reference circle 1200 before determining the second reference point 1102 within the quadrant of interest 1400.

The third reference point 1104 is then determined by building the second reference circle 1204 with the first reference point 1100 at its center. In certain embodiments, the second reference circle radius 1206 is 2.0 mm. In other embodiments, the first reference circle radius 1202 may be 1.8 mm, 1.9 mm, 2.1 mm or 2.2 mm. The third reference point 1104 is then located on the second reference circle 1204.

Figure 15:
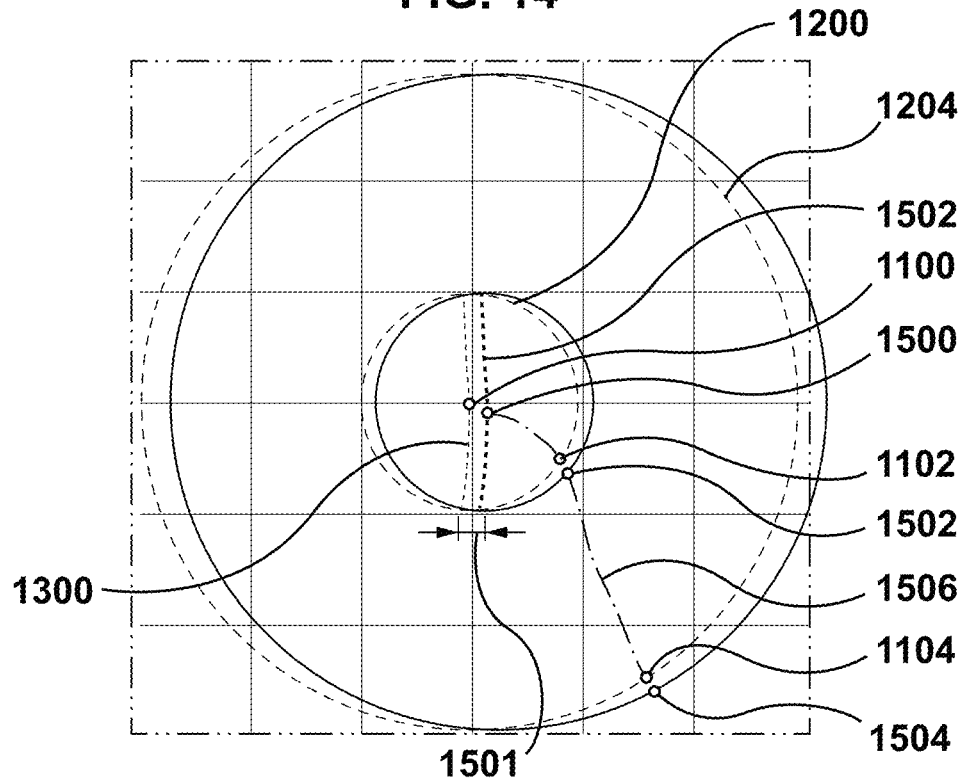
FIG. 15 depicts the cross-sectional view of FIG. 14 and including displaced reference points, in accordance with certain non-limiting embodiments of the present technology.

Referring to FIG. 15, as mentioned above, the first reference point 1100 is determined as being on the segmentation loop 1300 of the crown portion and the gingiva. However, in certain embodiments, the segmentation loop 1300 may not reflect accurately the actual gum line 29 between the crown portion and the gingiva due to artefacts at the imaging stage. Accordingly, inventors have identified that off-setting the first reference point 1100 to define an off-set first reference point 1500 by a predetermined off-set distance 1501 may remove at least some of the artefacts and determine a more accurate segmentation loop 1300. In such embodiments, the first reference circle 1200 and the second reference circle 1204 are determined from the off-set first reference point 1502. In other words, the first reference circle 1200 and the second reference circle 1204 are off-set by the predetermined off-set distance 1501. This results in an off-set second reference point 1502 and an off-set third reference point 1504. Further method steps performed by the processor may thus disregard a portion of the gingiva profile 1004 between the first reference point 1100 and the off-set first reference point 1500. This is referred to herein as a trimmed gingiva profile 1506.

In certain embodiments, the predetermined off-set distance 1500 is 0.15 mm. In other embodiments, the predetermined off-set distance 1500 is 0.10 mm or 0.20 mm.

The method 700 hence advances to step 708.

Step 708: Generating Using an Interpolation Algorithm, the Parametric Curve Extending Through Each One of the Set of Reference Points At step 708, the processor 650 may be configured to generate the parametric curve, which defines at least in part the gingiva profile 1004 of the tooth cross section profile 1000, using an interpolation algorithm.

It will be appreciated, that in embodiments in which the off-setting described above is performed, the generating the parametric curve is based on the trimmed gingiva profile 1506 and the off-set first reference point 1500, the off-set second reference point 1502 and the off-set third reference point 1504. In embodiments in which there is no off-setting, generating the parametric curve is based on the gingiva profile 1004, the first reference point 1100, the second reference point 1102 and the third reference point 1104.

The method 700 is not limited in terms of the interpolation algorithm used to define the parametric curve, and may use any of polynomial interpolation, spline interpolation, Gaussian interpolation, or the like.

In certain embodiments, the parametric curve is determined using the first reference point 1100, the second reference point 1102 and the third reference point 1104 and two vectors. In other embodiments, the parametric curve may be built as a polyarc curve.

In certain embodiments, the parametric curve is defined as a set of co-ordinates (e.g. (x,y) co-ordinates) which are represented as functions of one or more parameters. In other words, the parametric curve may be defined by relations between x, y and the one or more parameters.

In certain embodiments, the parametric curve is determined by (i) populating the gingiva profile 1004 or the trimmed gingiva profile 1506 with a plurality of uniformly distanced points ("populated points"), (ii) generating bidirectional lines perpendicular to the gingiva profile 1004 or the trimmed gingiva profile 1506, (iii) determining distances between corresponding populated points and intersection points to be calculated, (iv) determining a target function result value using a mean square value of the distances, and (v) minimizing the target function result value, using an optimization algorithm, to determine the one or more parameters of the parametric curve that match the gingiva profile 1004 or the trimmed gingiva profile 1506.

Figure 16:
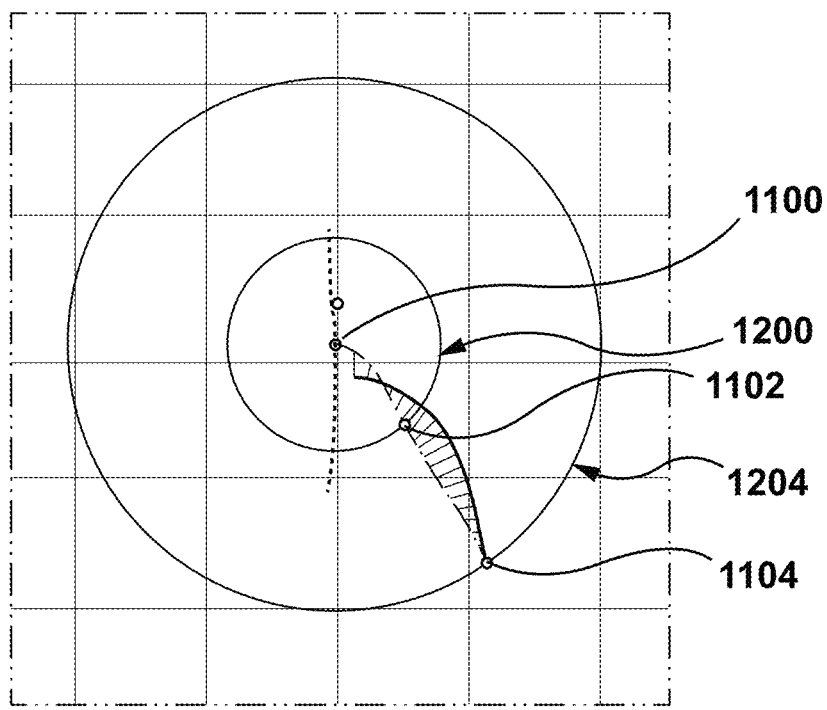
FIG. 16 depicts the cross-sectional view of FIG. 14 and including a depiction of a parametric determination from the reference points, in accordance with certain non-limiting embodiments of the present technology.
Figure 17:
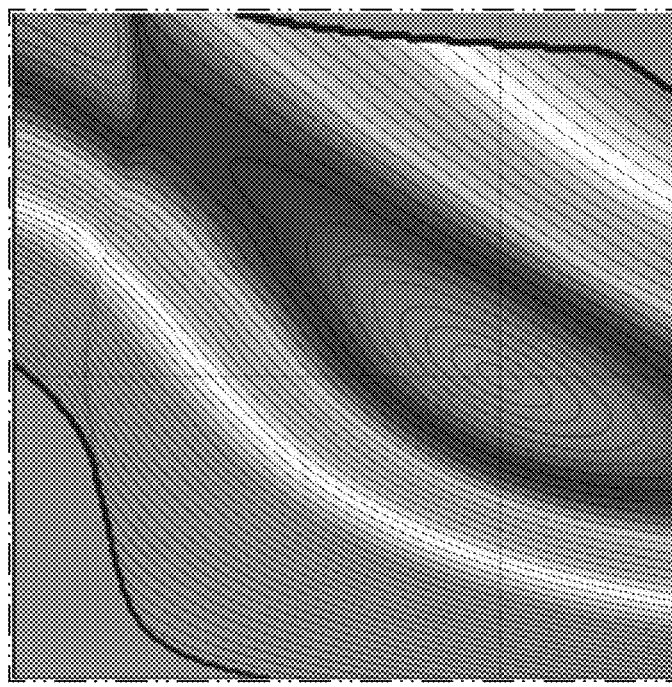
FIG. 17 depicts a target function plot of the parametric determination of FIG. 16, in accordance with certain non-limiting embodiments of the present technology.
Figure 18:
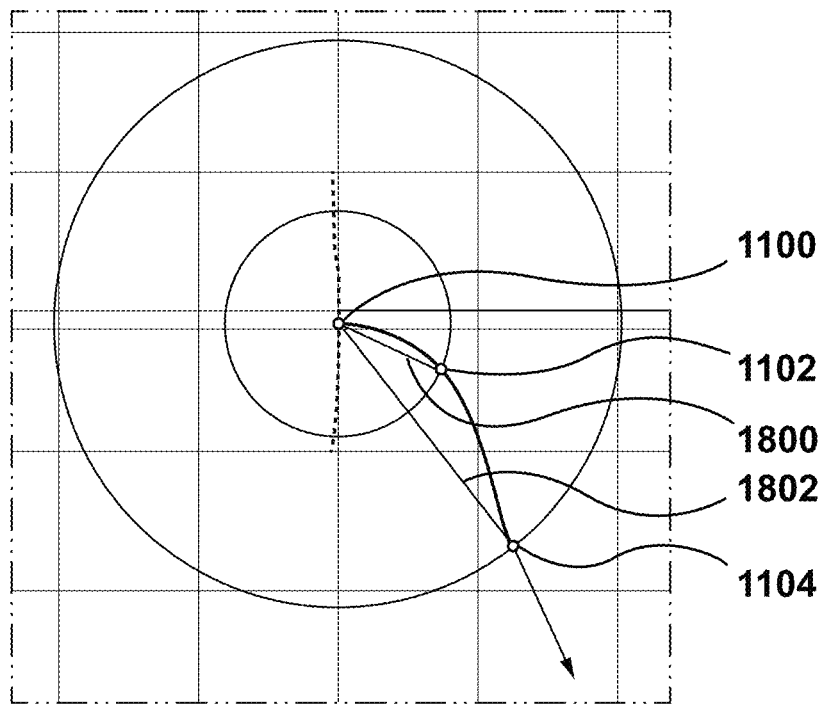
FIG. 18 depicts the cross-sectional view of FIG. 16 and including reconstructed curve parameters, in accordance with certain non-limiting embodiments of the present technology.

FIG. 16 depicts the populated points and the gingiva profile 1004. FIG. 17 depicts a target function plot with parameter C2 of the parametric curve along the x axis and parameter C1 of the parametric curve along the y axis. The intersecting horizontal and vertical black lines show best parameters and intersecting in function minimum. The parametric curve may thus be determined.

The optimization algorithm may comprise a gradient descent algorithm.

In yet other embodiments, the one or more parameters comprise R1, R2, R3 and R4 and are determined from the defined cross section 900 using the first reference point 1100, the second reference point 1102 and the third reference point 1104, the first reference point 1100 and the third reference point 1104 being ends of the parametric curve. In certain embodiments, R1 is determined as a position of the first reference point projected on the longitudinal tooth axis 902; R2 is determined by an angle between the x axis of the defined cross section 900 and a first line 1800 connecting the first reference point 1100 and the second reference point 1102; R3 is determined by an angle between the x axis of the defined cross section 900 and a second line 1802 connecting the first reference point 1100 and the third reference point 1104; and R4 is determined by an angle between the x axis of the defined cross section 900 and an ending vector from P3 (FIG. 18) tangent to the parametric curve. The parametric curve may thus be determined.

Figure 19A:
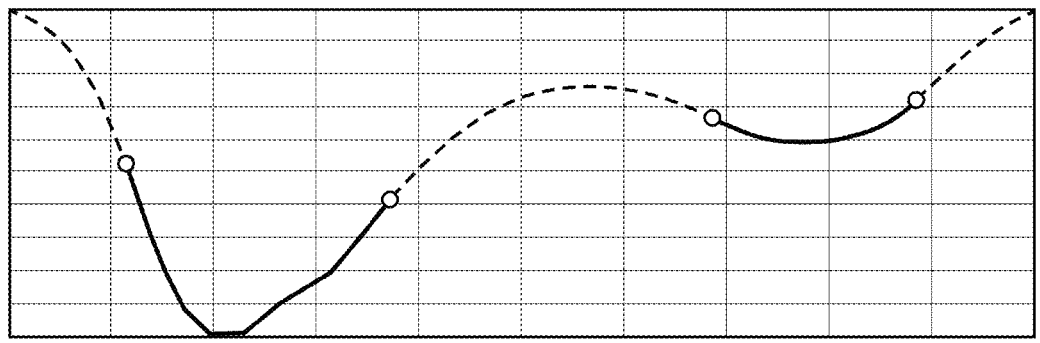
FIGS. 19A, 19B, 19C and 19D depicts interpolation of parameters R1, R2, R3 and R4, in accordance with certain non-limiting embodiments of the present technology.

Optionally, in certain embodiments, the method 700 comprises determining if there are one or more missing portions of the so determined parametric curve. This is performed in certain embodiments by plotting the so determined parameters and identifying any discontinuities. With reference to FIG. 19A-19D, there is shown a plot of each of the determined parameters R1, R2, R3 and R4, respectively. Referring firstly to FIG. 19A, the solid line represents the determined parameter R1. As the solid line is not continuous, it can be determined that parameter R1 is incomplete. Accordingly, the method 700 comprises interpolating R1 directly to determine an interpolated parametric curve. The dotted line in FIG. 19A depicts the interpolated portion of R1.

Figure 19B:
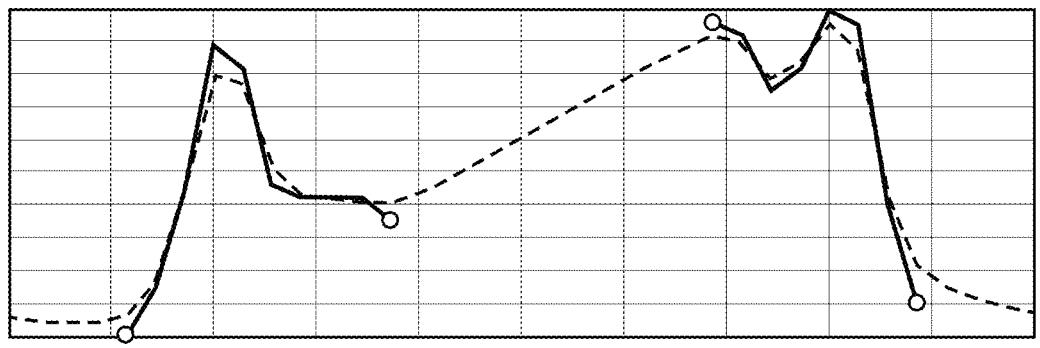
Figure 19C:
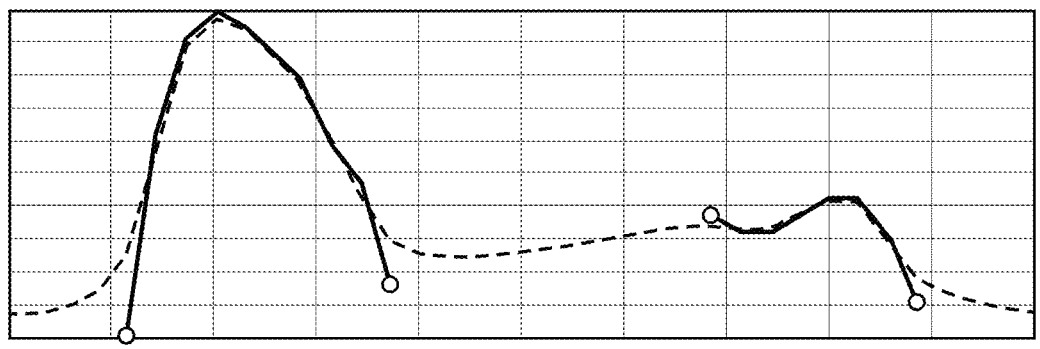
Figure 19D:
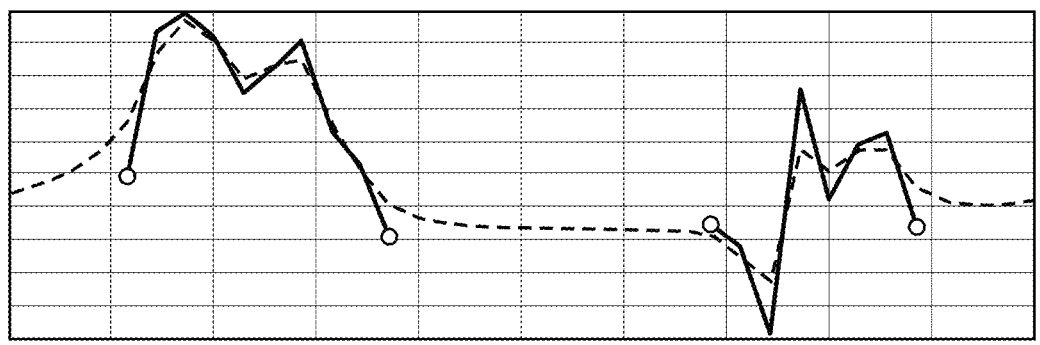

For R2, R3 and R4, illustrated in FIGS. 19B, 19C and 19D respectively, the plots are also discontinuous therefore require interpolation. However, the interpolation may be performed differently than for R1. In certain embodiments, interpolation of the parameters R2, R3 and R4 comprises building a NURBS curve using values as control points, determining new Y values using the built NURBS curve, and using the determined new Y values to further build an interpolated parametric curve.

In certain embodiments, the segmentation loop 1300 may be refined using interpolated points from the interpolated parametric curve. This will be described below with further reference to FIG. 21 and step 712 of the method 700.

In certain embodiments, the so determined parametric curve may be considered as a "bad" curve and should be disregarded. For example, in certain embodiments, candidates for "bad" curves include those that lie in areas between the teeth. For example, any determined parametric curves that have been determined using portions of the segmentation loop 1300 that are associated with distal or mesial portions of the given tooth 804 may be disregarded. Accordingly, in certain embodiments, the method 700 comprises determining whether a determined parametric curve is associated with one of a mesial portion or a distal portion of the segmentation loop 1300, and if so, disregarding the determined parametric curve. The method 700 may further comprise repeating steps 704-708 of the method 700 using a different defined cross section of the tooth 3D digital model 800 through the longitudinal tooth axis 902. The so disregarded cross section of the tooth 3D digital model 800 may then be treated as an undefined cross section (see step 710).

In any of the above embodiments, the method 700 may comprise performing a smoothing operation on either or both of the so determined parametric curve or the interpolated parameters.

In certain embodiments, the method 700 may comprise generating a plurality of defined cross sections, and determining for each one of the plurality of defined cross sections, a respective parametric curve. The method 700 may further comprise analyzing a given parametric curve to determine a respective set of curvature parameters associated therewith; determining a combination amongst respective sets of curvature parameters associated with respective parametric curves; and based on the combination amongst the respective sets of curvature parameters, determining a normalized parametric curve. The normalized parametric curve may be applied to the first undefined cross section to determine the first reconstructed gingival profile. The determining the combination amongst the respective sets of curvature parameters comprises averaging respective parameters over the respective sets.

The method 700 hence advances to step 710.

Figure 20:
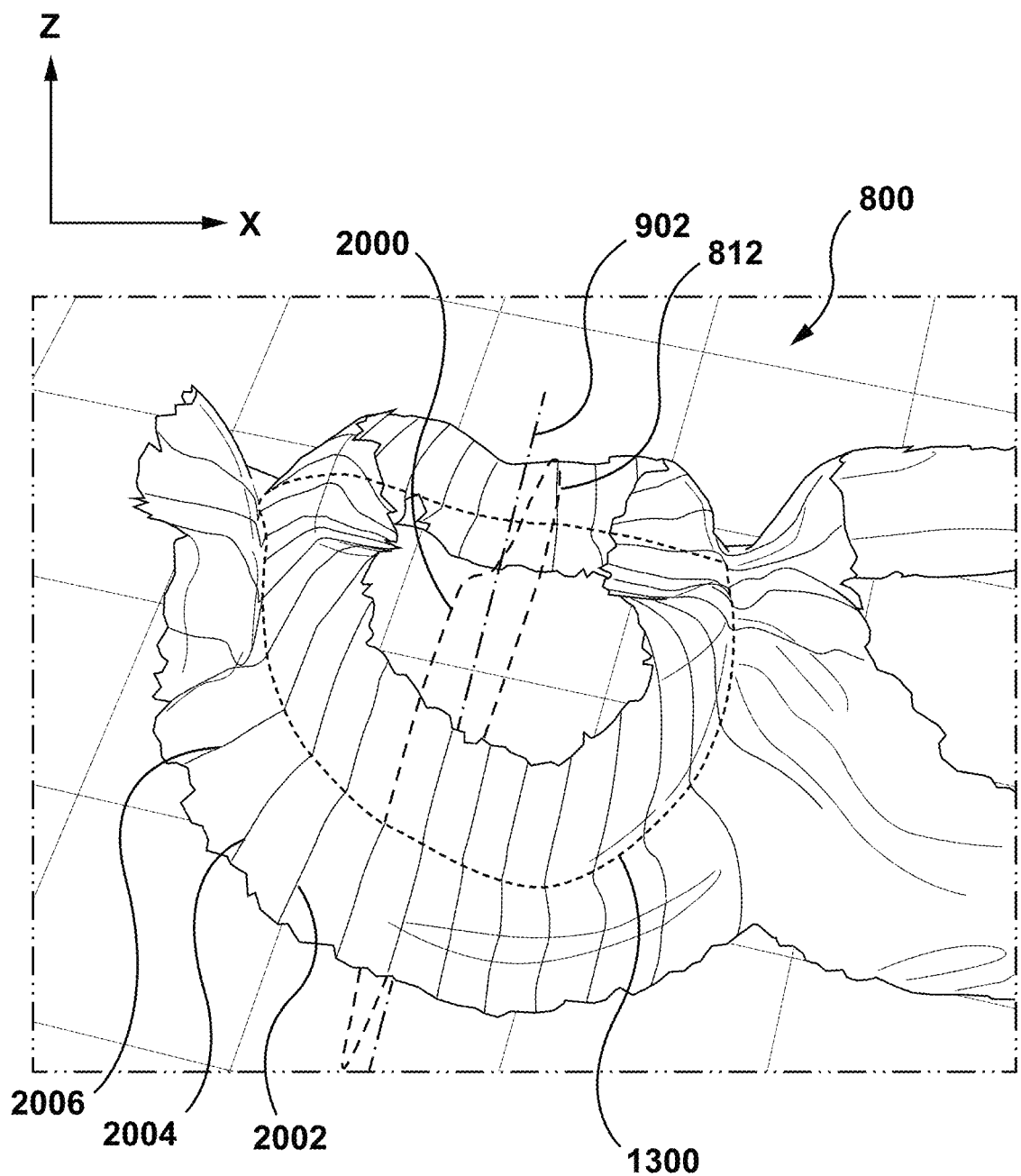
FIG. 20 depicts another close-up view of the tooth 3D digital model of the given tooth of FIG. 13 including the representation of the tooth portion and the gingiva portion of the given tooth, the segmentation loop and undefined cross sections of the arch form, in accordance with certain non-limiting embodiments of the present technology.
Figure 21:
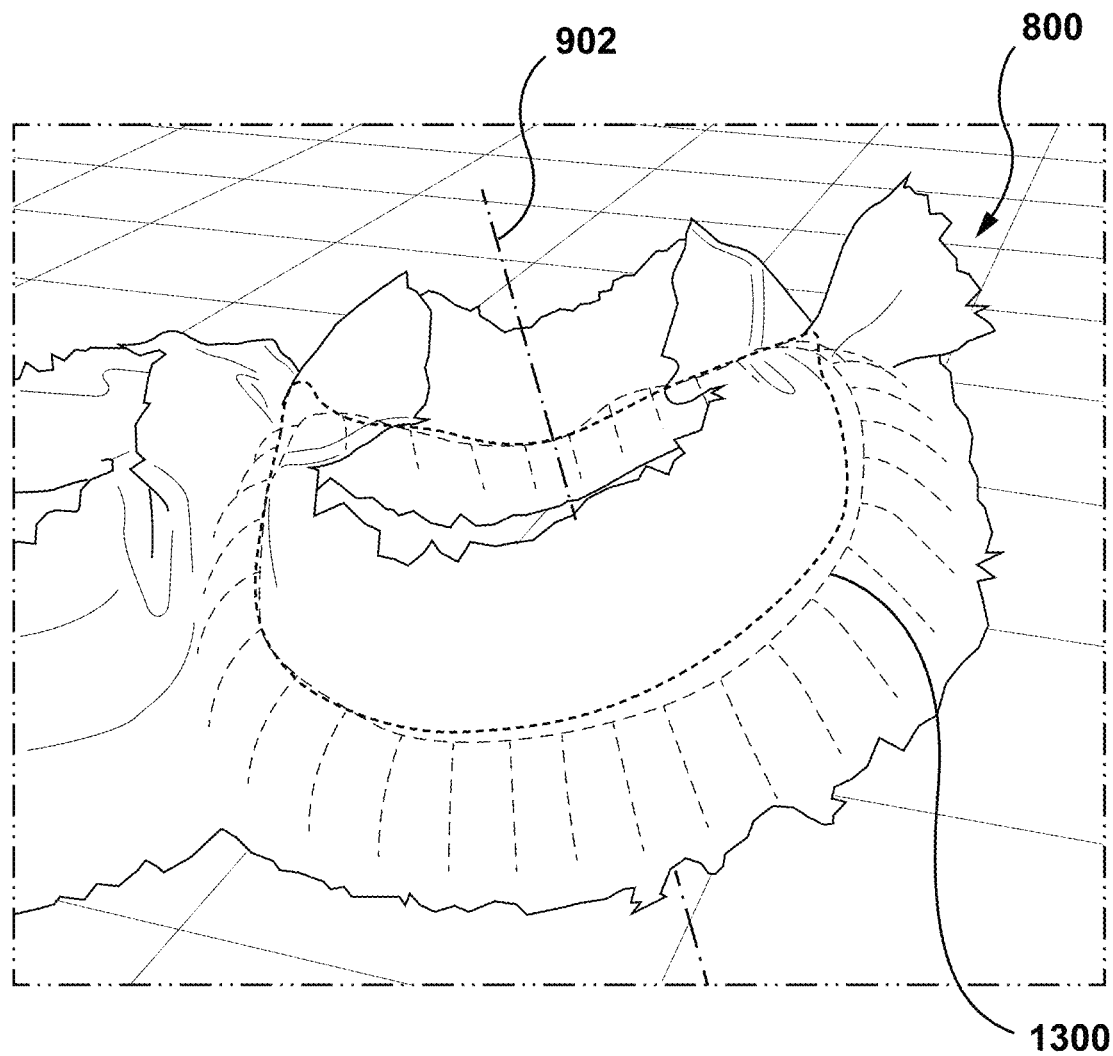
FIG. 21 depicts another close-up view of the tooth 3D digital model of FIG. 13 including the representation of the tooth portion and the gingiva portion of the given tooth, and a refined segmentation loop of the arch form, in accordance with certain non-limiting embodiments of the present technology.

Step 710: Generating, by the Processor, a First Undefined Cross Section of the Arch Form 3D Digital Model Along the Sagittal Plane, the Undefined Cross Section Extending Through the Longitudinal Tooth Axis of the Given Tooth and the Undefined Gingiva Region In Step 710, the method 700 comprises generating by the processor, such as the processor 650, a first undefined cross section of the tooth 3D digital model 800. Referring to FIG. 20, the tooth 3D digital model 800 of FIG. 13 is depicted with an example of a first undefined cross section 2000 of the tooth 3D digital model 800. Like the defined cross section 900, the first undefined cross section 2000 is taken along the sagittal plane and extends through the longitudinal tooth axis 902 of the give tooth 804. In certain embodiments, as for the defined cross section 900, a y axis of a coordinate system of the undefined cross section 2000 is collinear with the longitudinal tooth axis 902 and an x axis is perpendicular to the longitudinal tooth axis 902.

Unlike the defined cross section 900, the first undefined cross section 2000 extends through the undefined gingiva region 812. The first undefined cross section 2000 may be generated by moving radially the defined cross section 900 about the longitudinal tooth axis 902. A radial spacing between the defined cross section 900 and the adjacent first undefined cross section may be about 10°. In other embodiments, the radial spacing may be about 5°, about 6°, about 7°, about 8°, about 9°, about 11°, about 12°, about 13°, about 14°, or about 15°.

In certain embodiments, the first undefined cross section 2000 need not be adjacent to the defined cross section 900.

A position of the defined cross section 900 and/or the first undefined cross section 2000 may be predetermined according to a predefined rule. Hence in certain embodiments, the method 700 may comprise generating the first undefined cross section 2000 according to the predefined rule.

Any disregarded cross sections due to inclusion of a "bad curve" may be treated here as an undefined cross section.

The method 700 hence advances to step 712.

Step 712: Constructing in the First Undefined Cross Section, at Least a Portion of the Parametric Curve, Thereby Generating the Reconstructed Gingival Profile in the Arch Form 3D Digital Model At step 712, the method 700 comprises generating a reconstructed gingival profile in the first undefined cross section 2000 by applying the defined parametric curve from Step 708. The arch form 3D digital model 400 may thus be updated with the reconstructed gingival profile.

In certain embodiments, the applying the defined parametric curve may comprise determining a first undefined reference point, a second undefined reference point and a third undefined reference point (which correspond, respectively, to a location of the first reference point 1100, the second reference point 1102 and the third reference point 1104 relative to the longitudinal tooth axis 902), and using the determined first undefined reference point, second undefined reference point and third undefined reference point to anchor the defined parametric curve.

In yet other embodiments, the method 700 may comprise generating further undefined cross sections of the arch form 900, such as a second undefined cross section 2002, a third undefined cross section 2004, a fourth undefined cross section 2006, etc. (FIG. 20). For each one of the further undefined cross sections, the method 700 may comprise generating the reconstructed gingival profile by applying the determined parametric curve to each further undefined cross section.

In certain embodiments, the method 700 may comprise constructing, by the processor 650, in each one of a plurality of undefined cross sections, a respective instance of the parametric curve. The method 700 may further comprise constructing, based on a predetermined resolution value, a plurality of loft curves crossing respective instances of the parametric curve in each one of the plurality of cross sections, thereby defining a mesh of the tooth 3D digital model 800 including the reconstructed gingival profile. The plurality of undefined cross sections may equally radially spaced from each other based on a predetermined angular step. This may generate equally spaced mesh elements which can facilitate texturing and/or coloring.

A radial spacing between adjacent ones of the undefined cross sections may be predetermined. In certain embodiments, the radial spacing between adjacent ones of the undefined cross sections may be about 10°. In other embodiments, the radial spacing may be about 5°, about 6°, about 7°, about 8°, about 9°, about 11°, about 12°, about 13°, about 14°, or about 15°.

In certain embodiments, once the gingival profile of a plurality of undefined cross sections of the gingiva portion 806 of the tooth 3D digital model 800 has been reconstructed, the method 700 may comprise smoothing the gingiva profile.

In certain embodiments, the method 700 may comprise refining the segmentation loop 1300 according to an interpolated point of each undefined cross section, such as a point equivalent to the first reference point 1100 and a projection thereof on the longitudinal tooth axis 902.

With reference to FIG. 22A, there is depicted a schematic diagram of an updated tooth 3D digital model 2200 of the given tooth 804, including a reconstructed gingival portion 2202 generated, by the processor 650, based on the reconstructed gingival profile, in accordance with certain embodiments of the present technology.

In further embodiments, the processor 650 may be configured to smooth a surface of the reconstructed gingival portion 2202 in the updated tooth 3D digital model 2200 i. The smoothing may comprise filling in any gaps. To that end, according to specific non-limiting embodiments of the present technology, the processor 650 may be configured to apply one or more Harmonic functions to the reconstructed gingival profile. In the context of the present specification, the term "Harmonic function" relates to the field of mathematical physics and denotes a function that satisfies Laplace's equation. Accordingly, applying the one or more Harmonic functions for restoring the smooth surface within the gaps may be associated with setting certain boundary conditions.

Thus, according to some non-limiting embodiments of the present technology, the boundary conditions for the one or more Harmonic functions may comprise vertex coordinates and respective vertex normal vectors defined at respective vertices of those of the plurality of confirmed mesh elements, which are located at a boundary of the reconstructed gingival portion 2202. By doing so, the processor 650, using the one or more Harmonic functions, can be said to be configured to "propagate" smoothness of the updated tooth 3D digital model 2200 to the reconstructed gingival portion of the arch form, in a sense, "patching" the gaps with the smooth surface.

Additionally, according to certain non-limiting embodiments of the present technology, after restoring the smooth surface within the updated tooth 3D digital model 2200, the processor 650 may be configured to redefine mesh elements associated with the updated tooth 3D digital model 2200 such that vertices thereof are distributed substantially uniformly. This may facilitate subsequent application of color and texturing to the updated tooth 3D digital model 2200.

In yet other embodiments, the method 700 may comprise repeating the above-described method steps for other teeth of the upper teeth 16 of the subject, thereby generating the updated arch form 3D digital model 2204 of the upper arch form 20, as depicted in FIG. 22B, in accordance with certain non-limiting embodiments of the present technology. As it can be appreciated, the updated arch form 3D digital model 2204 includes an updated representation of the gingiva 27 of the subject generated based on respective reconstructed gingival portions associated with each other one of the upper teeth 16, as described above — such as the reconstructed gingival portion 2202 associated with the given tooth 804.

Step 714: Storing the Arch Form 3D Digital Model Including the Reconstructed Gingival Profile In step 714 of the method 700, the processor 650 is configured to store the updated arch form 3D digital model 2204 including the reconstructed gingival profile in a memory, such as the memory 670.

In some embodiments, the method 700 could further include determining an orthodontic treatment for the subject based at least in part on the updated arch form 3D digital model 2204 including the reconstructed gingival profile. The determination of the orthodontic treatment may be performed by modelling respective movements of given ones of the upper teeth 16 including a respective deformation of the associated gingiva portion 806.

In some embodiments, the method 700 could further include manufacturing one or more orthodontic treatment appliances for the subject, such as the aligner 30. In at least some implementations, manufacturing one or more orthodontic treatment appliances for the subject could include sending, by the processor 650, instructions to the manufacturing system 430 to cause the aligner 30 to be manufactured. For example, one or more aligners 30 could be manufactured using the manufacturing system 430, where a design of the orthodontic treatment appliance produced is based at least in part on the updated arch form 3D digital model 2204 including the reconstructed gingival profile.

In some embodiments, the method 900 further includes causing displaying, such as on an interactive display system operatively connected to the processor 650, the updated arch form 3D digital model 2204 including the reconstructed gingival profile. In some such cases, the updated arch form 3D digital model 2204 including the reconstructed gingival profile could be configured to be manipulated by the user or operator of the interactive display system.

The more accurate modelling of the gingiva portions due at least in part to the reconstructed gingival profile may allow, for example, for one or more of (a) a more accurate and effective detection and avoidance of potential collisions between the associated crown portions of the upper teeth 16 in the course of the orthodontic treatment, and (b) manufacturing of an orthodontic appliance for administering at least a part of the orthodontic treatment and which may provide more comfort to the user and/or a more effective treatment.

Needless to say that, in other non-limiting embodiments of the present technology, the processor 650 may be configured to apply the same method as described above, mutatis mutandis, to tooth representations of the lower teeth thereby generating a respective updated arch form 3D digital model (not separately numbered in FIG. 22B) of the lower arch form 21 including reconstructed gingival portions thereof.

The method 700 hence terminates.

It should be noted that, in some non-limiting embodiments of the present technology, the method 700 may be executed, by the processor 650, separately and/or independently based on respective input data. However, in other non-limiting embodiments of the present technology, each of these methods may be used in any combination therewith depending on a particular task at hand for reconstructing a respective anatomical structure associated with the subject.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of reconstructing a gingival profile in an arch form 3D digital model of a subject, the method executable by a processor of an electronic device, the method comprising:
   acquiring, by the processor, the arch form 3D digital model of the arch form of the subject, the arch form 3D digital model including a tooth portion representative of a given tooth of the subject and a gingiva portion representative of adjacent gingiva around the given tooth,
   the gingiva portion including a defined gingiva region and an undefined gingiva region requiring reconstruction;
   generating, by the processor, a defined cross section of the arch form 3D digital model along a sagittal plane, the defined cross section extending through a longitudinal tooth axis of the given tooth and the defined gingiva region, the defined cross section including a tooth cross section profile, the tooth cross section profile including at least:
      a crown profile, the crown profile being indicative of at least a portion of a surface profile of a crown portion of the given tooth; and
      a gingiva profile, the gingiva profile being indicative of at least a portion of a surface profile of the adjacent gingiva;
   identifying, within the tooth cross section profile, based on a predetermined instruction, a set of reference points for generating a parametric curve defining at least a portion of the tooth cross section profile;
   generating, by the processor, using an interpolation algorithm, the parametric curve based on the set of reference points;
   generating, by the processor, a first undefined cross section of the arch form 3D digital model along the sagittal plane, the undefined cross section extending through the longitudinal tooth axis of the given tooth and the undefined gingiva region;
   constructing, by the processor, in the first undefined cross section, at least a portion of the parametric curve, thereby generating a first reconstructed gingival profile, and updating the arch form 3D digital model with the first reconstructed gingival profile; and
   storing, by the processor, the arch form 3D digital model including the reconstructed gingival profile.

2. The method of claim 1, wherein the predetermined instruction for identifying the set of reference points comprises: determining, by the processor, the set of reference points based on a predetermined distance from the longitudinal tooth axis.

3. The method of claim 1, wherein the set of reference points comprises a first reference point and a second reference point, the predetermined instruction for identifying the set of reference points comprises: determining, by the processor, the first reference point based on the longitudinal tooth axis, and the second reference point based on a predetermined distance from the first reference point.

4. The method of claim 1, wherein the identifying the set of reference points comprises:
   determining, by the processor, a first reference point of the set of reference points at an intersection of the tooth curve with the gingiva profile, the first reference point defining a first reference axis parallel to the longitudinal tooth axis;
   determining, by the processor, a second reference point of the set of reference points at an intersection of the gingiva profile with a first reference circle centred at the first reference axis and having a first reference circle radius; and
   determining, by the processor, a third reference point of the set of reference points as an intersection of the gingiva profile with a second reference circle centred at the first reference axis and having a second reference circle radius.

5. The method of claim 4, wherein the first reference circle radius of the first reference circle is determined such that the first reference point corresponds to a location of a gingival pocket.

6. The method of claim 4, wherein the second reference circle radius is larger than the first reference circle radius.

7. The method of claim 1, wherein the identifying the set of reference points comprises:
   determining, by the processor, a first reference point of the set of reference points, the first reference point comprising an off-set point of intersection of the tooth curve with the gingiva profile, the first reference point defining a first reference axis parallel to the longitudinal tooth axis;
   determining, by the processor, a second reference point of the set of reference points at an intersection of the gingiva profile with a first reference circle centred at the first reference axis and having a first reference circle radius; and
   determining, by the processor, a third reference point of the set of reference points as an intersection of the gingiva profile with a second reference circle centred at the first reference axis and having a second reference circle radius.

8. The method of claim 7, further comprising updating the gingiva profile to exclude a portion lying between (i) the intersection of the tooth curve with the gingiva profile, and (ii) the first reference point.

9. The method of claim 8, wherein the generating the parametric curve comprises defining at least a portion of the gingiva profile.

10. The method of claim 1, wherein the generating the parametric curve comprises defining at least a portion of the gingiva profile.

11. The method of claim 1, wherein the generating the parametric curve comprises:
   determining a preliminary parametric curve based on the set of reference points, the preliminary parametric curve comprising a set of preliminary curve parameters,
   determining a target function describing a degree of non-conformity of the parametric curve to the gingiva profile; and
   minimizing the target function to obtain an optimized parametric curve comprising a set of optimized curve parameters.

12. The method of claim 11, wherein the minimizing the target function comprises applying a gradient descent algorithm.

13. The method of claim 1, wherein the generating the parametric curve comprises:
   determining a preliminary parametric curve based on the set of reference points, the preliminary parametric curve comprising a set of preliminary curve parameters;
   determining if there are missing curve parameters relating to the preliminary parametric curve, and determining each missing curve parameter by interpolating the preliminary curve parameters.

14. The method of claim 1, further comprising generating, by the processor, a second undefined cross section of the arch form 3D digital model along the sagittal plane, the second undefined cross section being spaced from the first undefined cross section and extending through the longitudinal tooth axis of the given tooth and the undefined region of the gingiva portion; and constructing, by the processor, in the second undefined cross section, a second reconstructed gingival profile by applying the determined parametric curve; and updating the arch form 3D digital model using the first second reconstructed gingival profile and the second reconstructed gingival profile.

15. The method of claim 1, wherein the first undefined cross section and the second undefined cross section are radially spaced from each other about the longitudinal tooth axis.

16. The method of claim 1, further comprising:
   generating, by the processor, a plurality of defined cross sections and a plurality of undefined cross sections, the plurality of defined cross sections and the plurality of undefined cross sections being radially spaced from each other about the longitudinal tooth axis;
   constructing, by the processor, in each one of the plurality of cross sections, a respective instance of the parametric curve; and
   constructing, based on a predetermined resolution value, a plurality of loft curves crossing respective instances of the parametric curve in each one of the plurality of cross sections, thereby defining a mesh of the arch form 3D digital model.

17. The method of claim 16, wherein the plurality of cross sections are equally radially spaced from each other based on a predetermined angular step.

18. The method of claim 1, wherein:
   the generating the defined cross section comprises generating a plurality of defined cross sections radially spaced from each other relative to the tooth axis;
   the generating the parametric curve comprises generating, for each one of the plurality of defined cross section, a respective parametric curve;
   the method further comprises:
      analyzing a given parametric curve to determine a respective set of curvature parameters associated therewith;
      determining a combination amongst respective sets of curvature parameters associated with respective parametric curves; and
      based on the combination amongst the respective sets of curvature parameters, determining a normalized parametric curve; and wherein:
         the updating the arch form 3D digital model with the first reconstructed gingival profile comprises constructing, in each one of the plurality of cross sections of the arch form 3D digital model, a respective instance of the normalized parametric curve.

19. The method of claim 18, wherein the determining the combination amongst the respective sets of curvature parameters comprises averaging respective parameters over the respective sets.

20. A system for reconstructing a gingival profile in an arch form 3D digital model of a subject, the system comprising a processor of an electronic device, the processor configured to execute a method comprising:
   acquiring, by the processor, the arch form 3D digital model of the arch form of the subject, the arch form 3D digital model including a tooth portion representative of a given tooth of the subject and a gingiva portion representative of adjacent gingiva around the given tooth,
   the gingiva portion including a defined gingiva region and an undefined gingiva region requiring reconstruction;
   generating, by the processor, a defined cross section of the arch form 3D digital model along a sagittal plane, the defined cross section extending through a longitudinal tooth axis of the given tooth and the defined gingiva region, the defined cross section including a tooth cross section profile, the tooth cross section profile including at least:
      a crown profile, the crown profile being indicative of at least a portion of a surface profile of a crown portion of the given tooth; and
      a gingiva profile, the gingiva profile being indicative of at least a portion of a surface profile of the adjacent gingiva;
   identifying, within the tooth cross section profile, based on a predetermined instruction, a set of reference points for generating a parametric curve defining at least a portion of the tooth cross section profile;
   generating, by the processor, using an interpolation algorithm, the parametric curve based on the set of reference points;
   generating, by the processor, a first undefined cross section of the arch form 3D digital model along the sagittal plane, the undefined cross section extending through the longitudinal tooth axis of the given tooth and the undefined gingiva region;
   constructing, by the processor, in the first undefined cross section, at least a portion of the parametric curve, thereby generating a first reconstructed gingival profile, and updating the arch form 3D digital model with the first reconstructed gingival profile; and storing, by the processor, the arch form 3D digital model including the reconstructed gingival profile.

\* \* \* \* \*